(12) United States Patent
Brightbill et al.

(10) Patent No.: US 6,595,586 B2
(45) Date of Patent: *Jul. 22, 2003

(54) TWO PLATFORM MOTION SEAT

(75) Inventors: Stephen T. Brightbill, Vista, CA (US); David W. Flesner, San Diego, CA (US); Eric Lai Sai Cheong, Shatin (HK); Tony Wong Hing Leung, Shatin (HK); Wesley Yau Tze Ming, Lam Tin (HK); Albert Poon Wai Tong, Tsuen Wan (HK); Paul A. Repicky, Del Mar, CA (US); David M. Hensel, Canton, MI (US)

(73) Assignee: Seat Revolution, Inc., Del Mar, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/057,192

(22) Filed: Jan. 25, 2002

(65) Prior Publication Data

US 2002/0145321 A1 Oct. 10, 2002

Related U.S. Application Data

(60) Continuation-in-part of application No. 09/536,207, filed on Mar. 27, 2000, now Pat. No. 6,357,827, which is a continuation-in-part of application No. 09/305,837, filed on May 5, 1999, now Pat. No. 6,340,207, which is a division of application No. 08/940,921, filed on Sep. 30, 1997, now Pat. No. 5,913,568.

(51) Int. Cl.[7] .................. A47C 3/02; A47D 13/10
(52) U.S. Cl. .............. 297/312; 297/258.1; 297/233; 297/314
(58) Field of Search ................ 297/312, 314, 297/233, 258.1

(56) References Cited

U.S. PATENT DOCUMENTS

| | | | | |
|---|---|---|---|---|
| 5,913,568 A | * | 6/1999 | Brightbill et al. | 297/312 X |
| 6,079,782 A | * | 6/2000 | Berg et al. | 297/312 X |
| 6,340,207 B1 | * | 1/2002 | Brightbill et al. | 297/312 X |
| 6,357,827 B1 | * | 3/2002 | Brightbill et al. | 297/312 |

* cited by examiner

Primary Examiner—Rodney B. White
(74) Attorney, Agent, or Firm—Curtis L. Harrington

(57) ABSTRACT a seating structure provides improved comfort and includes a single, pair, or multiple numbers of moving seating assemblies with independent platforms, especially suited for the automotive or aircraft seating environments. A motion mechanism provides each seating assembly with at least one of total rocking, vertical up and down movement, lateral, and limited slight turning movement and in one embodiment generally constrains the seat members of the seat assemblies from interference with each other. The seating assemblies are provided at a neutral angle that corresponds to the particular application of the seat. Independent up and down movement, and rocking, improves seating comfort health, and safety especially as applied to a seating environment, where a user is likely to be seated for an extended period, such as in an automobile or aircraft.

18 Claims, 24 Drawing Sheets

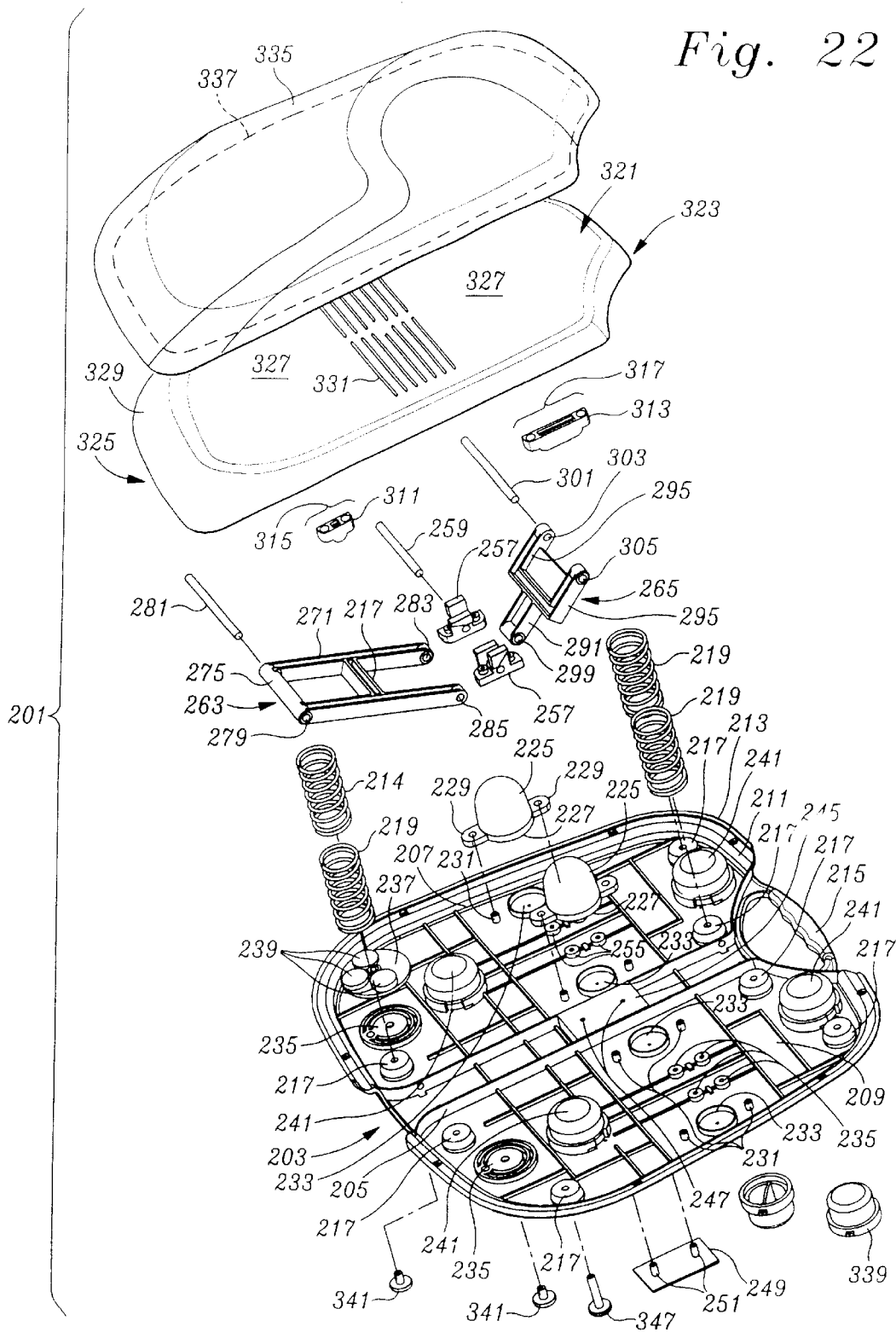

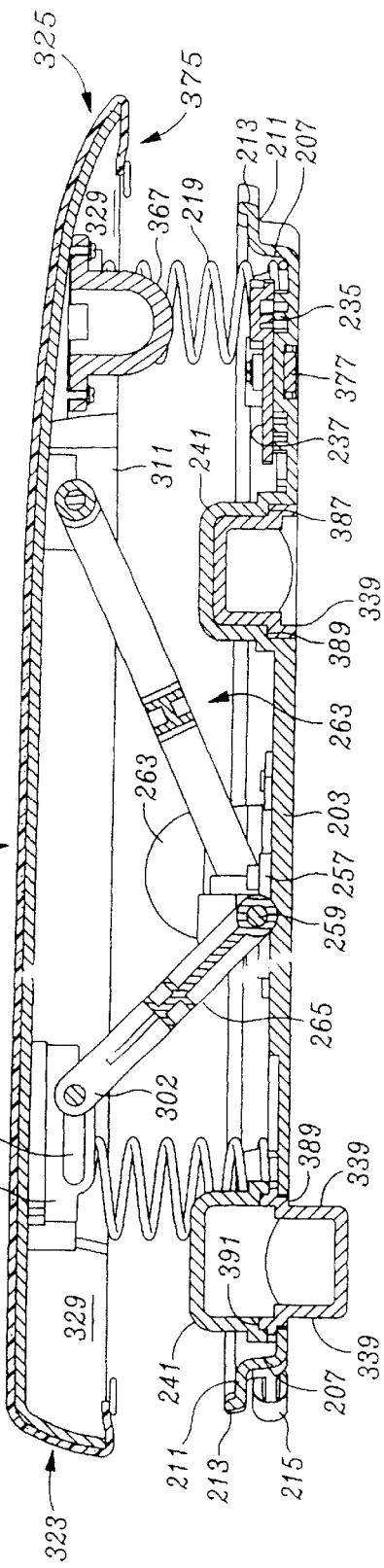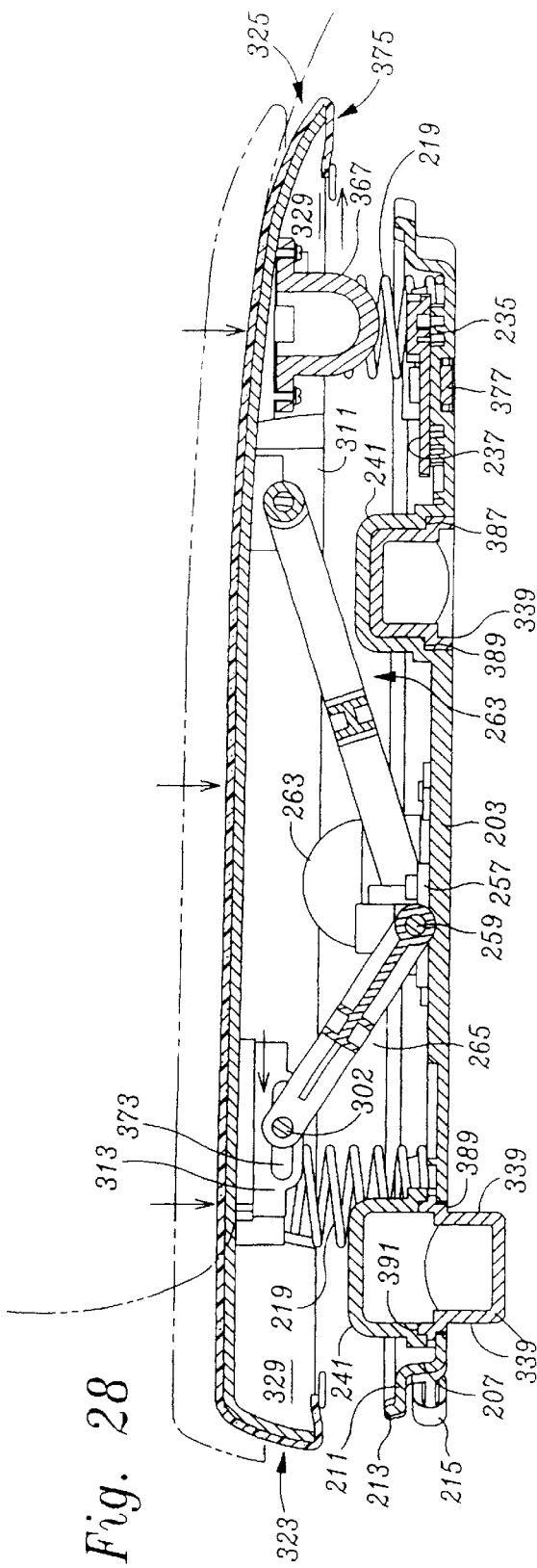

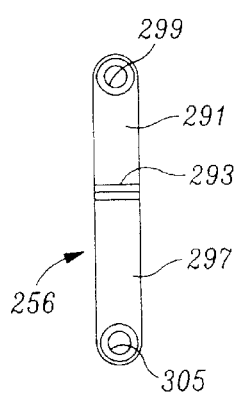
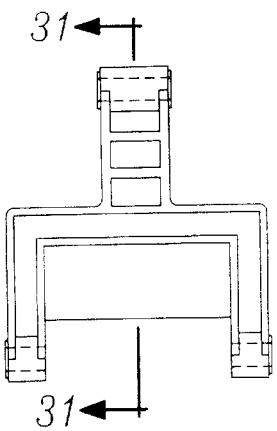
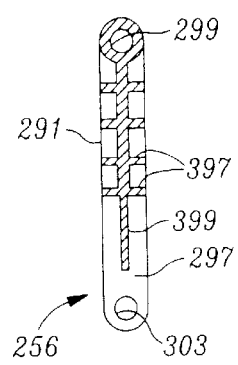
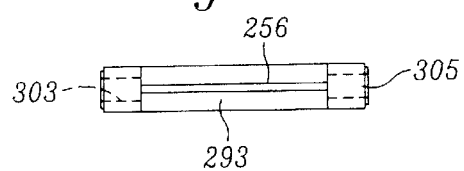
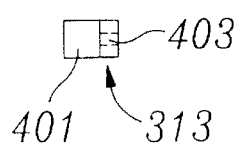
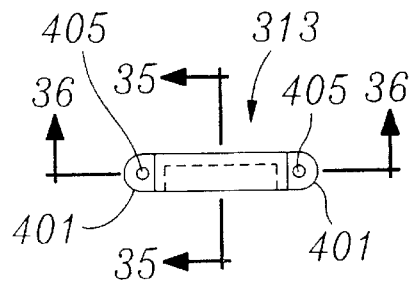
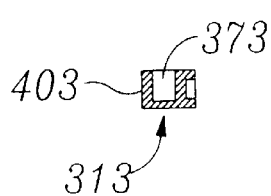
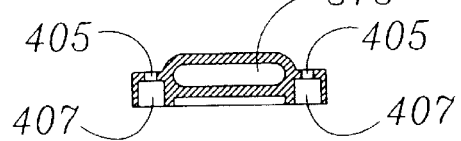

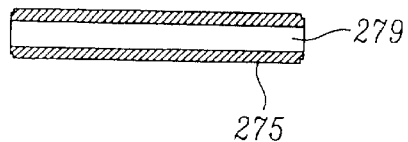
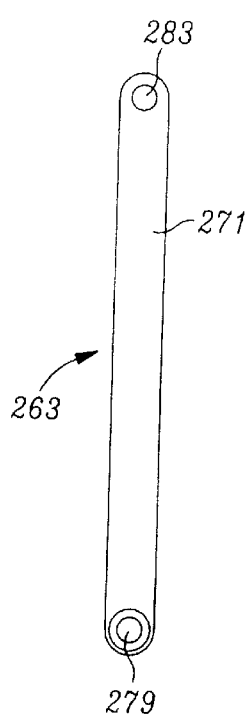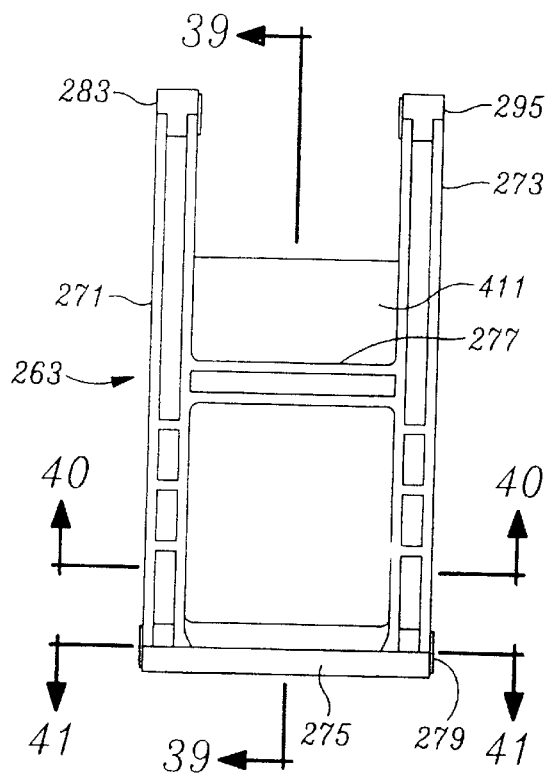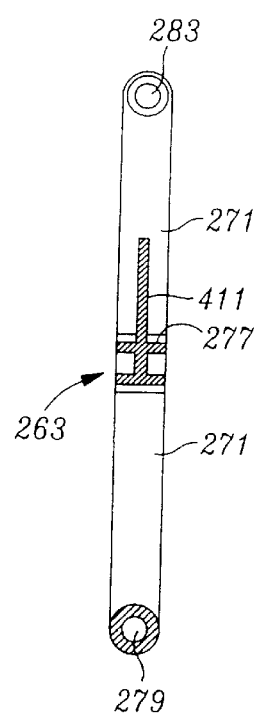
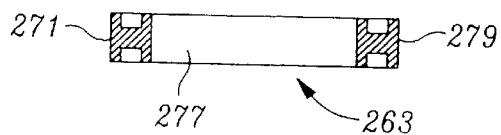

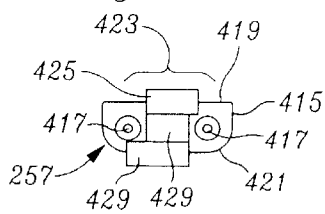
Fig. 42
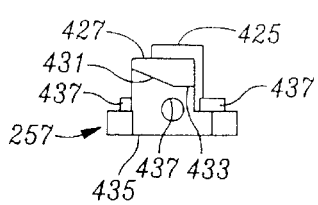
Fig. 43
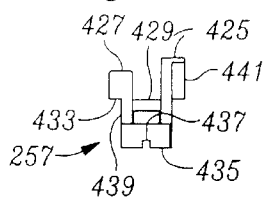
Fig. 45
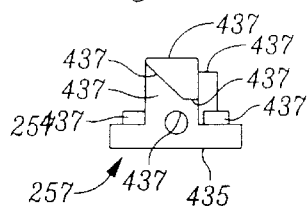
Fig. 44
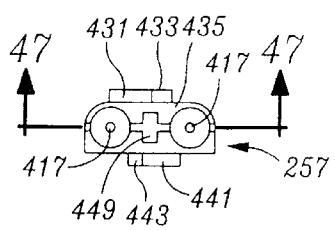
Fig. 46
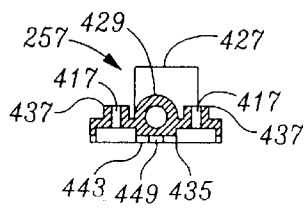
Fig. 47
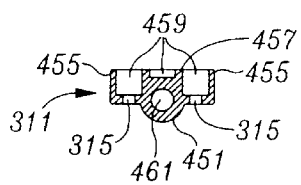
Fig. 50
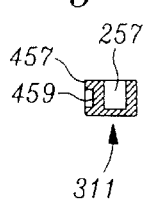
Fig. 51
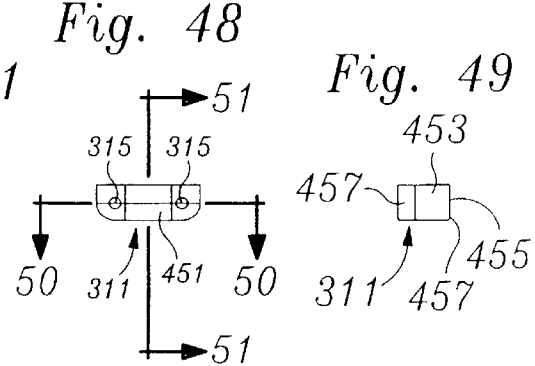
Fig. 48
Fig. 49

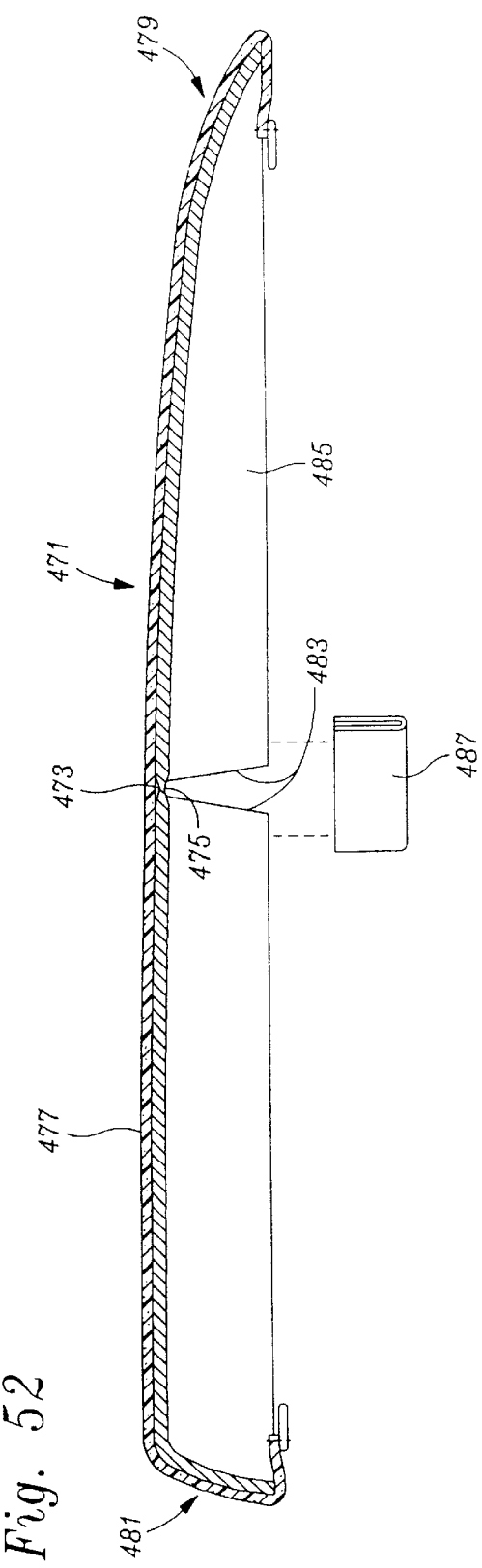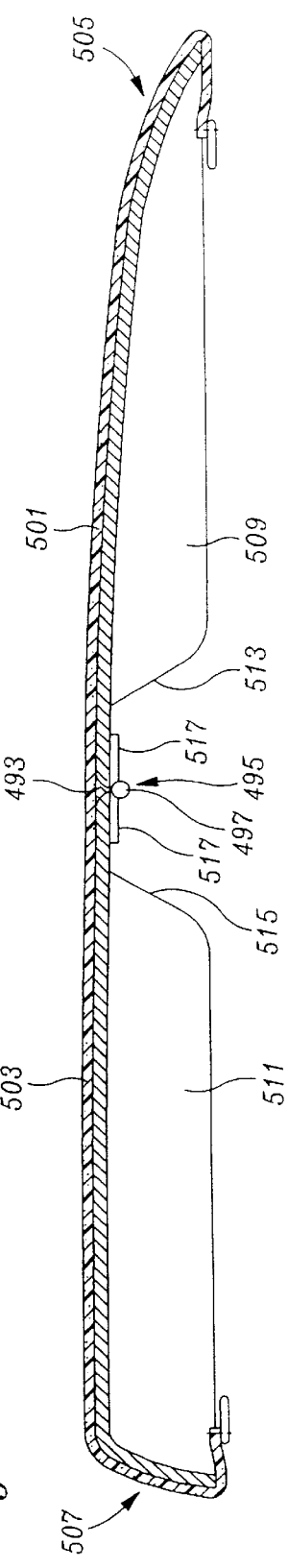

TWO PLATFORM MOTION SEAT

This is a continuation-in-part of U.S. patent application Ser. No. 09/536,207 filed Mar. 27, 2000, now U.S. Pat. No. 6,357,827, which is a continuation in part of U.S. patent application Ser. No. 09/305,837 filed May 5, 1999, now U.S. Pat. No. 6,340,207, which is a divisional of then U.S. patent application Ser. No. 08/940,921 filed Sep. 30, 1997 now U.S. Pat. No. 5,913,568.

BACKGROUND OF THE INVENTION

1. Field of the Invention

This invention relates generally to a seat, and, more particularly, to a seat with a pair of moving seat platforms and platform improvements enabling a portable one and two platform seat which can be easily transported, and particularly to a seat which can be used on and interfitting upon a variety of surfaces.

2. Description of the Related Art

Most seats in the past did not promote seated occupant movement analogous as to that which happens when a standing person shifts his weight from side to side. This adjustment enables a standing person to shift weight from one side of the pelvis to the other. Conventional seating doesn't enable a person to shift weight in this fashion while seated. Conventional seating thus does not permit much weight shifting from side to side and thus forces the weight of the user to be borne too much and too long by the flesh of the buttocks and thighs, and not enough by the ischial tuberosities ("seat bones"). Further, seats that do not promote occupant movement will by converse action cause the seated occupant to sit in a constrained or static posture. This can lead to a number of health-related problems. For example, constrained occupant seating postures can cause joint impairments (arthritis), inflamed tendon sheaths (tendinitis, peritendinitis), chronic joint degeneration (arthroses), and muscle pain (e.g., when the occupant shifts weight on the seat bones, from side to side, or leans to one side, the occupant stresses his or her back muscles to remain adequately supported on the seat).

Prolonged static seating has also been linked to back problems because of the prolonged static pressure on the spine. Prolonged static pressure on the spine impairs fluid flow from the discs, impairing glucose transport, disc nutrition, and the elimination of waste products.

Constrained occupant postures also cause poor circulation. Edema of the lower legs is commonly induced by lack of movement. Leg edema is problematic because local pooling of the blood increases venous pressures to the heart, blood pressure, and heart rate. Edema may predispose the occupant to varicose veins, hemorrhoids, and other peripheral venous disorders such as cold feet. Another circulation problem resulting from seats that do not promote occupant movement is deep venous thrombosis caused by the formation of venous clots in the legs. These blood clot formations occur from sitting in a static position for long periods of time. Other circulation problems occur when certain parts of the occupant's posterior or legs experience greater pressure than the portion of the seat, especially the front, digs into the other seated portions of the occupant. This occurs when a portion of a seat, especially the front of the seat, impinges the posterior or back of the legs of the occupant, or if the occupant leans more towards one side of the seat than the other side. Either effect can result in decreased circulation to the lower body. These concentrated forces and effects on the legs and posterior inhibit circulation and lead to discomfort.

Some seats have been designed to promote occupant movement and improve the comfort of the seated occupant. Some of these seats include a pair of seat platforms that move independently of each other. Each seat platform rocks in a see-saw manner on a fulcrum. In one of these seats, the fulcrum also allows vertical movement of the seat platform as the seat platform slides backwards and forwards. The independent seat platforms are designed to be self aligning, and allow the posterior of the occupant to move normally and independently without restraint, improving seat comfort.

The problem with these seats is that they are not comfortable for multiple seating applications and environments (e.g., office, home, automobile, etc.). In most seating environments, these seats do not properly distribute the weight of the body being borne by the ischial tuberosities and the residual weight of the posterior and thigh over the two seating platforms during different seat positions (e.g., one leg up, both legs up, both legs down, legs crossed, etc.). This causes discomfort and circulation problems. Also, in most seating environments, the seats did not allow the exercise necessary for the muscles, tendons, and ligaments of the lower back, pelvis, and thigh areas. This leads to circulation problems, flexibility problems, and back problems. Further, there was no adjustability for varying weights and sizes of seat occupants, nor no small fine tuning possible for necessary comfort by the individual seat user.

In terms of the infra structural existence of conventional seating, seating which is utilizably available, as well as purchasable is overwhelmingly of a type which is deleterious to the proper support of the human structure. One of the main obstacles to proper seating is the lack of complementary seating which can be used with the existing seating infrastructure. What is needed is a mechanism, process or structure which enables existing seating to be retrofitted with proper seating or which enables proper seating to be added to the conventional seating infrastructure.

SUMMARY

An object of the present invention is to overcome the above-described difficulties of static seating and particularly in overcoming a current static seating condition, including traditional flat, over padded and contoured seating which by cradling constrains the posterior, such disadvantages of which are found in the overwhelmingly large numbers of conventional seating.

An aspect of the present invention involves the recognition that a seat with a single one, or a pair or more of seat platforms or assemblies that optimal seating comfort is achieved by providing the seat assemblies at a predetermined neutral angle appropriate for the particular application of the seat. Such neutral angle is defined as the angle, relative to horizontal, at which the seat assemblies are initially oriented before any external forces are applied to the seat. It is further recognized that each seat assembly should rock and move vertically up to a predetermined amount corresponding to a neutral angle discussed more fully below.

Another aspect of the present invention involves four additional recognitions. First, in greater positive neutral angle seating applications (leaned-back seating), the amount of rocking and vertical movement should be greater. Second, in smaller positive neutral angle seating applications, the amount of rocking and vertical movement should be smaller. Third, in greater negative neutral angle seating applications (leaned-forward seating), the amount of rocking movement should be greater, but the amount of vertical movement should be smaller. Finally, in smaller negative neutral angle seating applications, the amount of rocking and vertical movement should be smaller.

An additional aspect of the present invention involves a seat with either a pair, multiple, or a single moving seat assembly. A motion mechanism allows vertical motion and rocking motion in each seat assembly. The seat assembly is provided at a neutral angle based on the application of the seat. The total amount of rocking motion and vertical motion allowed depends on the neutral angle of the seat assembly. This combination causes the weight of a seated occupant borne by the ischial tuberosities and the residual weight of the posterior and thighs to be distributed optimally over the two seating assemblies, regardless of the occupant's seated position. The combination also allows the muscles, tendons, and ligaments of the lower back, pelvic, and thigh areas to be exercised, improving fluid flow (e.g., blood circulation), alertness, flexibility, and inhibiting back pain.

In particular, the inventive seating of the claimed invention is able to provide the above advantages in an extremely low profile, safe, portable, traditional office seating, transportation (automobile, aircraft, trucking), or almost any seating structure. Single application, dual or multiple independent movement and even forward movement which is somewhat independent of rear movement is achievable in a light-weight, portable and built-in fashion, and with features which are not easily implementable in a low height structure. The inventive seat in one embodiment has a system which includes a somewhat exponential, somewhat stepwise, increasing spring resistance, which is important both as a requisite for narrow height seating and an important achievement despite the narrow height space. The vertical displacement of the seat of the invention is achieved through springs, polymeric members and rubber stops, along with some adjustabilty achievable by a circular stepped structure for engagement of the polymeric members. As such, the engagement point of the polymeric members adjusts the point at which the spring resistance begins going exponential.

The single, two or multiple platform version of the seat of the invention includes a lateral direction stabilizing mechanism which guides each platform on each side to facilitate optimum down/up movement, and independent rocking from back to front. It also prevents encroachment of either platform in the direction of the other platform. This prevents scissoring of the seat members and yet provides the proper amount of platform freedom. The lateral direction stabilization mechanism also facilitates, along with seating halves or other section, which at minimum bow or pivot at the middle, system in which the seating acts differently at their forward ends than at their rearward ends. A firmer more even forward support, along with more accommodating rear support, is unusually inventive in a seat having limited height.

A further embodiment illustrating a modular approach to the aircraft environment, as well as a four platform approach to the motor vehicle environment are seen. These configurations present modifications which enable rocking motion combined with or without a vertical up and down motion combined with or without a limited turning motion, and with or without lateral motion. As a result, these motions may be achieved simultaneously or individually or in subcombination. The modular approach assists in lowering the costs of installation and replacement.

BRIEF DESCRIPTION OF THE DRAWINGS

These and other features of the invention will now be described with reference to the drawings which are intended to illustrate and are not to limit the invention, and in which:

FIG. 22 is an exploded view of one platform of a two platform portable seat of the invention;

FIG. 27 is a side sectional view showing the two platform seat of FIGS. 22–26 in assembled position and in an uppermost, non downwardly displaced position;

FIG. 28 is a side sectional view, as is seen in FIG. 26, and showing the two platform seat in a downwardly displace position as would occur during the seating support of a user in a centered and neutral but body weighted position;

FIG. 29 is a side view of a "Y" shaped lateral support seen in FIG. 22;

FIG. 30 is a plan view of the "Y" shaped lateral support seen in FIG. 29;

FIG. 31 is a sectional view of the "Y" shaped lateral support taken along line 31—31 of FIG. 30;

FIG. 32 is top view of the "Y" shaped lateral support seen in FIGS. 29–31;

FIG. 33 is a side view of a long fitting;

FIG. 34 is a top view of the long fitting of FIG. 33;

FIG. 35 is a sectional view of the long fitting taken along line 35—35 of FIG. 34;

FIG. 36 is a sectional view of the long fitting taken along line 36—36 of FIG. 34;

FIG. 37 is a side view of a flat "A" shaped lateral support;

FIG. 38 is a plan view of the flat "A" shaped lateral support of FIG. 37;

FIG. 39 is a sectional view of the flat "A" shaped lateral support taken along line 39—39 of FIG. 38;

FIG. 40 is a sectional view of the flat "A" shaped lateral support taken along line 40—40 of FIG. 38;

FIG. 41 is a sectional view of the flat "A" shaped lateral support taken along line 41—41 of FIG. 38;

FIG. 42 is a top view of one of the supports seen in FIG. 22, the other such support not seen in the drawings is a mirror image, and thus the support seen in FIGS. 42–47 is of one such mirror configuration;

FIG. 43 is a first side view of the support of FIG. 42;

FIG. 44 is a second side view of the support of FIG. 42;

FIG. 45 is an end view of the support of FIG. 42;

FIG. 46 is a bottom side view of the support of FIG. 42;

FIG. 47 is a sectional view of the support of FIG. 42 taken along line 47—47 of FIG. 46;

FIG. 48 is a top view of a short fitting seen in FIG. 22;

FIG. 49 is a side view of the short fitting of FIG. 48;

FIG. 50 is a sectional view taken along line 50—50 of FIG. 48;

FIG. 51 is a side sectional view taken along line 51—51 of FIG. 48;

FIG. 52 is a side sectional view of one embodiment of a seat member having a thinned area to form a hinge separation;

FIG. 53 is a side sectional view of another embodiment of a seat member having a hinge separation;

DETAILED DESCRIPTION

Figure 1:
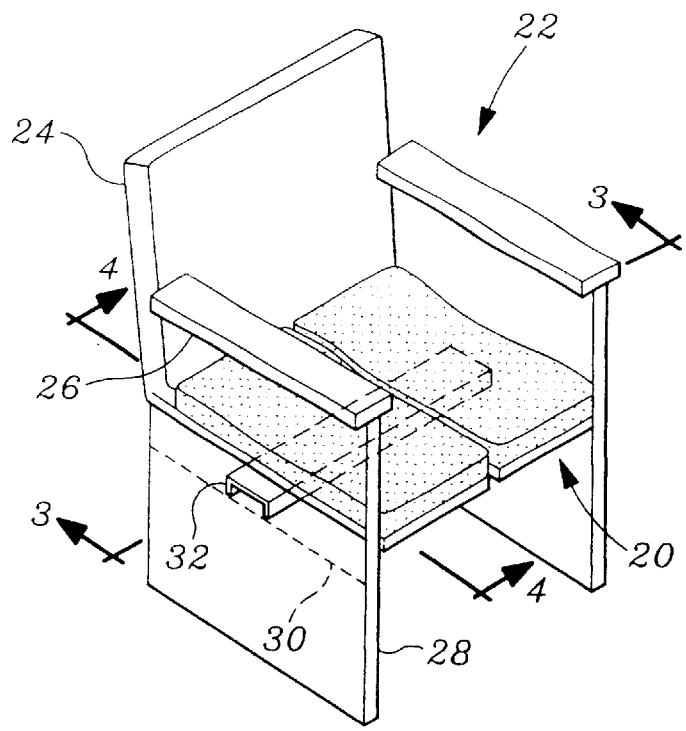
FIG. 1 is a perspective view of an office or stationary chair with an embodiment of the two platform motion seat of the present invention incorporated therein.

With reference to FIG. 1, a two platform motion seat 20 constructed in accordance with an embodiment of the invention is shown incorporated into an office or stationary chair 22. The chair 22 includes a back 24, arms 26, and legs 28. On opposite sides of the chair 22, an apron 30 connects an upper part of the legs 28. A support or foundation 32 extends laterally across the chair 22 and is supported by the aprons 30. The two platform motion seat 20 is supported by the lateral support 32.

Although the two platform motion seat 20 is shown and described in conjunction with an office chair 22, it will be readily understood by the reader that an office or stationary chair is just one of the many seating applications or environments that the two, multiple or, single platform motion seat of the present invention may be incorporated into. For example, but not by way of limitation, the two platform motion seat of the present invention may also be incorporated into the following types of seats: task (e.g., assembly line seating), auto, light trucks, long-haul trucking, military vehicles, heavy equipment, tractors, auditorium, theater, stadium, institutional, formal, leisure, dining furniture, motion (e.g., recliners), rocking, stationary furniture (e.g., dining room chairs), folding chairs, stacking chairs, airline, bus, train, motorcycles, golf carts, wheelchair, exercise devices, stools, sit/stand chairs, and hand held, after-market portable seats.

In addition, the seat that the two platform motion seat 20 is incorporated into may include, but not by way of limitation, any of the following improvements that are not shown: headrests, armrests, leg rests, manual or power adjustment mechanisms, heating/cooling devices, and vibration/massage mechanisms. For example, the two platform motion seat may include any of the manual user adjustment mechanisms (e.g., seat height control mechanism, tilt control mechanism, etc.) found on many modern chairs.

Figure 2:
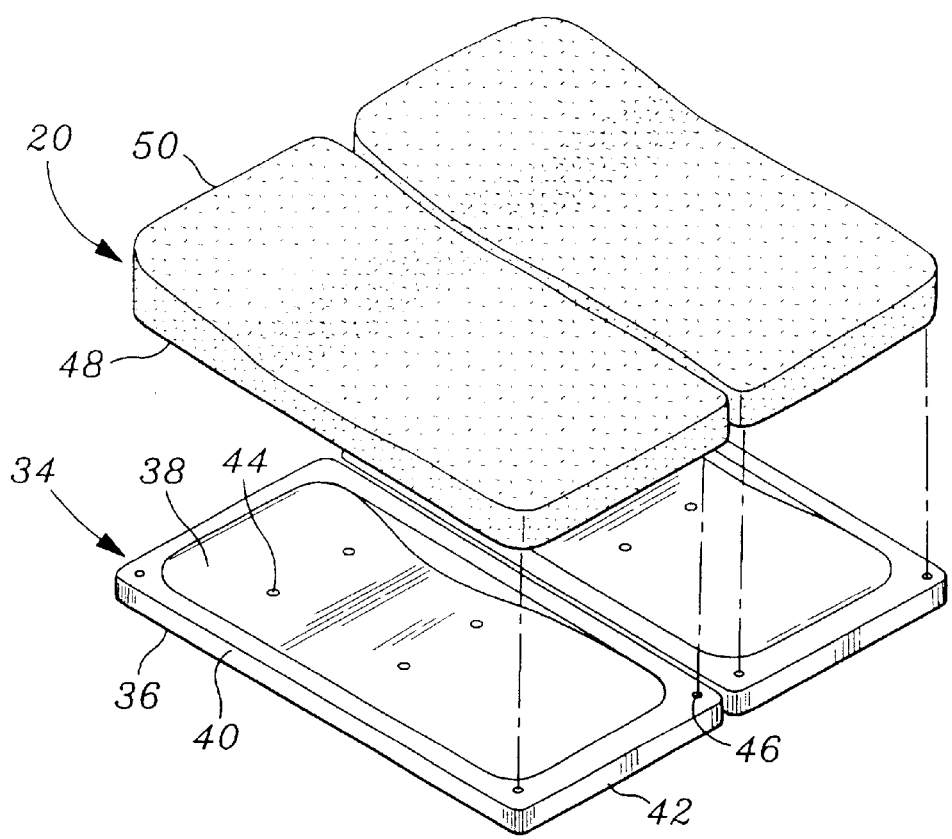
FIG. 2 is an exploded view of an embodiment of the seat assemblies of the two platform motion seat of the present invention.

With reference to FIG. 2, the two platform motion seat 20 includes a pair of adjacent seat assemblies 34. Each seat assembly 34 has a seat platform or body 36, which may be made of metal, plastic, a frame with webbing, or an inflatable device. The seat body 36 may have a generally rectangular shape and includes a main body 38 and a periphery 40. The main body 38 may have contouring of any shape for additional seating comfort. The periphery 40 may include a flanged portion 42. The seat body 36 may include a set of holes 44 in the main body 38 and a set of holes 46 in the periphery 40.

Although not shown, the seat body 36 may be subdivided into two or more subsections, laterally or longitudinally. The subsections of the seat assemblies 34 may rock and move vertically in the manner described more fully below. Subdividing the seat body 36, especially subdividing the seat body 36 into movable subsections, makes the seat body 36 more responsive to the movements of the seated occupant.

Each seating assembly 34 may include a cushioning material 48 and/or an outer upholstery covering 50. The cushioning material 48 and upholstery 50 may be attached onto the seat body 36 with threaded fasteners (not shown), which fit through the periphery holes 46, or with any other suitable fastening means such as glue. The cushioning material 48 and/or upholstery 50 may be contoured for additional seating comfort. It should be noted, in certain seating applications (e.g., outdoor stadium seating), the cushioning material 48 and/or upholstery 50 might not be added.

With reference to FIGS. 3–7, the seating assemblies 34 preferably move independently of each other through at least one motion mechanism, which is represented symbolically as MM in order for the reader to better understand the motion and orientation provided in the two platform motion seat of the present invention. Although one motion mechanism MM is preferably provided for each seating assembly 34, a single motion mechanism MM may be provided for both seating assemblies, or multiple motion mechanisms MM may be provided for each seating assembly 34. The motion mechanism MM provides the seating assembly 34 with vertical motion and rocking motion. A number of embodiments of the motion mechanism MM are shown in FIGS. 11–19 and described below. Although these embodiments of the motion mechanism MM include different types of spring arrangements, it will be readily understood by the reader that other types of motion mechanisms MM may be used, such as, but not by way of limitation, pneumatic mechanisms (e.g., air bladder), hydraulic mechanisms, magnetic mechanisms, or motorized mechanisms (in conjunction with sensor arrangement, control circuit, and/or computer). It should also be noted that the seating assemblies 34 do not have to move completely independently of each other; the movement of the seating assemblies may be interrelated.

Figure 3:
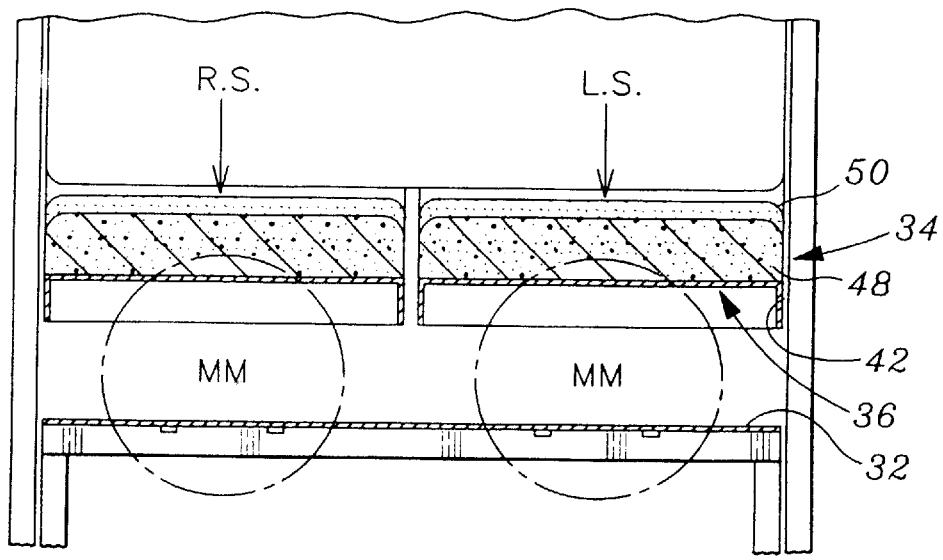
FIG. 3 is a cross-sectional view of the two platform motion seat of FIG. 1, taken along line 3—3 of FIG. 1.
Figure 4:
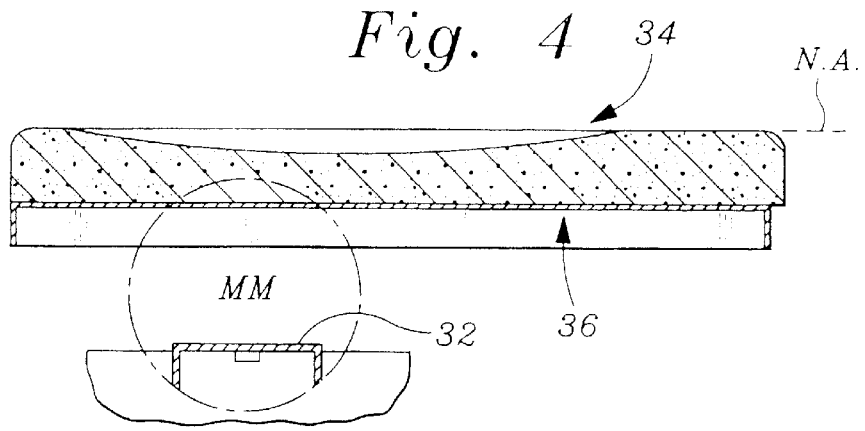
FIG. 4 is a cross-sectional view of the two platform motion seat of FIG. 1, taken along line 4—4 of FIG. 1, and shows the motion mechanism (MM) symbolically and the seat assembly.
Figure 5:
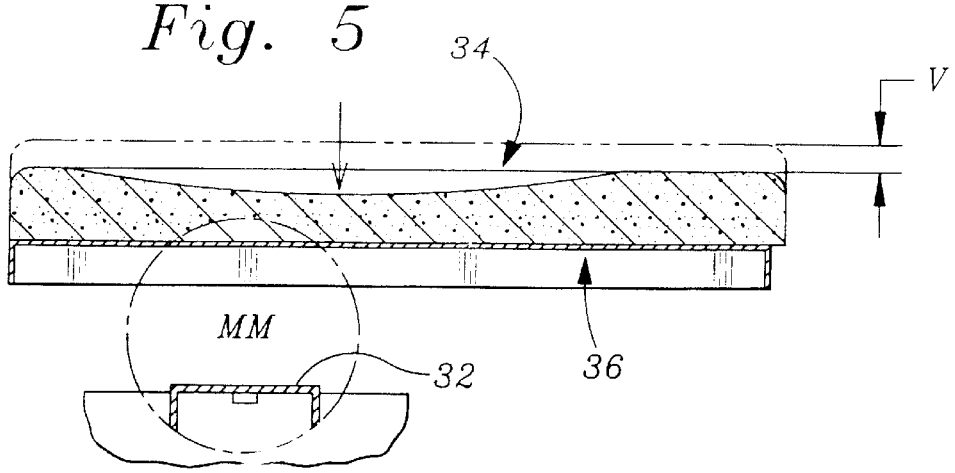
FIG. 5 is a cross-sectional view, similar to FIG. 4, and shows the vertical movement capability of the seat assembly.

With reference to FIGS. 3–5, the vertical or up-and-down motion of the seat assembly 34 will now be described. When seated, an occupant sits generally upon his or her ischial tuberosities or seat bones. The weight of the occupant generally creates a pair of respective resultant forces R.S., L.S. on the seat assemblies 34. Each motion mechanism MM allows its seat assembly 34 to travel downwards a respective distance V (FIG. 5) corresponding to the magnitude of the force R.S., L.S. on it. When the force R.S., L.S. is removed from the seat assembly 34, the motion mechanism MM causes the seat assembly 34 to rise vertically to its original position (FIG. 4).

In traditional seats that do not have independent moving seat halves, when the occupant shifts weight on the seat bones, from side to side, or leans to one side, the occupant stresses his or her back muscles to remain adequately supported on the seat. Not only does this cause discomfort in the lower back, but the concentrated load on the side of the posterior that the occupant is leaning to causes discomfort.

The motion mechanism MM provides the seat assemblies 34 with the independent vertical motion the pelvis requires to accommodate shifting weight on the seat bones, from side to side, and maintain a balanced weight distribution between the two seat bones. This allows the pelvis to perform its role as the "fulcrum of the body" while seated, just as it does while standing, walking, or running. When standing, walking, or running, the pelvis serves as a balance or pivot point for the upper body, adjusting when the occupant shifts weight from side to side. In traditional seats, the pelvis is restricted from functioning as a balance or pivot point. Consequently, the weight of the upper and lower body is not balanced properly on the seat. The motion mechanism MM provides enough movement to allow the pelvis to function effectively as a pivot point. This provides proper weight distribution for the occupant's upper and lower body, leading to the proper adjustment of the spine, and allowing the occupant to be better supported on the seat. This inhibits lower back pain because the back muscles are not stressed to maintain balance and helps reduce the aforementioned concentrated loads on one side of the posterior.

The inventors have determined that this vertical distance V should range from approximately 0.1 in. to 4.0 in., depending on the neutral angle, which will be described in more detail below, and the particular seating application. If the amount of vertical movement is less than approximately 0.1 in., the inventors have determined that the seating assembly 34 would provide insufficient movement to the pelvic bones to allow for proper adjustment of the spine and maintain a balanced weight distribution between the two ischial tuberosities. Also, if the amount of up-down motion is too small the seat will feel too hard, creating too much static pressure on the ischial tuberosities. If the amount of vertical movement is greater than approximately 4.0 in., the seating assembly 34 can result in unstable postures and/or the creation of additional stress on the muscles to maintain balance. While approximately 0.1 to 4.0 inches is believed to be the desired range of movement. At least about 0.8 in. is more preferable for numerous applications because it prevents the seat from feeling too hard and allows for a more stable posture.

Figure 6:
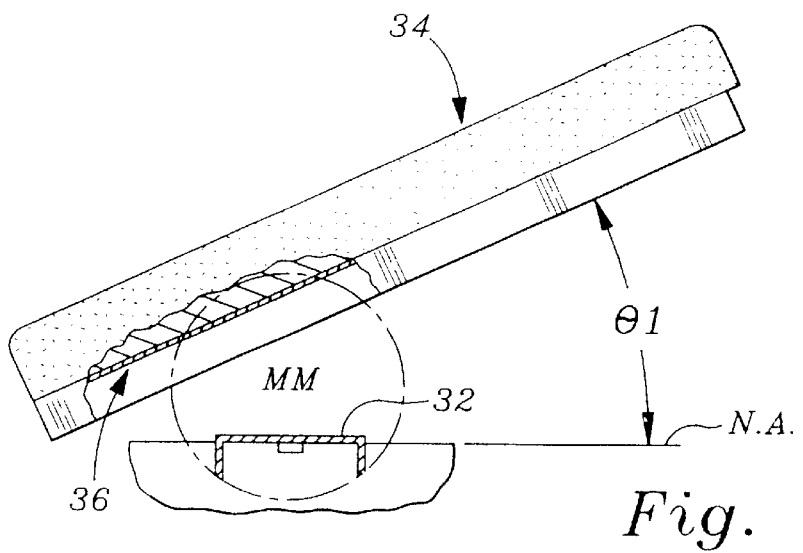
FIG. 6 is a cross-sectional view, similar to FIGS. 4 and 5, and shows the rocking capability of the seat assembly through a positive angle ($\alpha_1$)
Figure 7:
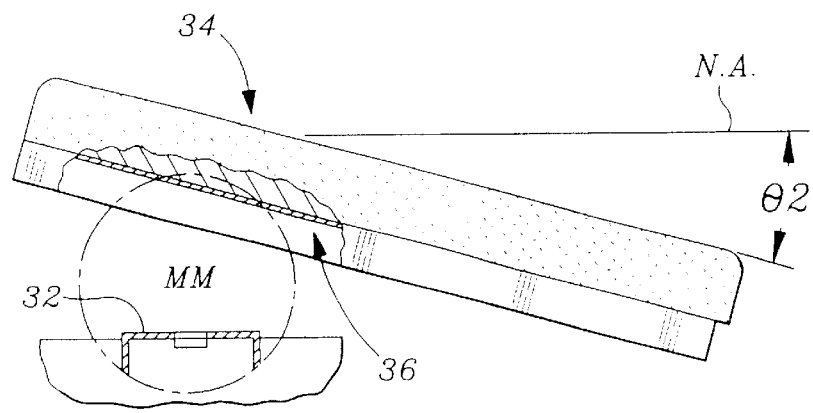
FIG. 7 is a cross-sectional view, similar to FIGS. 4–6, and shows the rocking capability of the seat assembly through a negative angle ($\alpha_2$)

FIGS. 6 and 7 illustrate the rocking or see-saw motion of the seat assembly 34. When an occupant sits on the seat assemblies 34, the occupant's location on the seat assemblies 34 and his or her seating posture will cause each seat assembly 34 to rock to a rocking angle θ through the motion mechanism MM. The rocking angle θ is the angle that the seat assembly rocks through, relative to the initial, unburdened orientation or neutral angle disposition NA of the seat. For rocking angle α calculation purposes, the neutral angle disposition NA of the seat is considered to be the origin or 0°. Although in FIGS. 3–7 the neutral angle disposition NA is horizontal, it will become better understood below that the neutral angle disposition NA varies, depending on the particular application of the seat 20.

The independent rocking motion of the seat assemblies 34 provided by the motion mechanism MM allows each seat assembly 34 to move in the above-described rocking manner with the movements of the occupant, optimally distributing the weight of the occupant over the seat assemblies 34 so as to inhibit discomfort and/or circulation problems. The rocking movement causes exercising of the muscles, tendons, and ligaments in the lower back, pelvic, and thigh areas by causing movement in these areas of the body. This promotes circulation, feeding nutrients, eliminating waste metabolites, and inhibiting leg swelling (edema), blood clotting, and other peripheral venous disorders. This exercise also feeds inter-vertebral discs through passive changes in osmosis. Movement-induced changes of pressure "feed" inter-vertebral discs nutrients and eliminate waste products by passive diffusion. This enhances the cushion effect the discs have on the occupant's vertebrae, reducing back problems caused by sitting. The movement also increases occupant alertness as afferent nerves send impulses to the central nervous system. Occupant comfort is also increased because the seat movement constantly redistributes pressures acting on the spine, joints, and tissue.

The seat assembly 34 of FIG. 6 is shown at a rocked back angle $\theta_1$ ($\theta_1 > 0°$). The seat assembly 34 of FIG. 7 is shown at a rocked-forward angle $\theta_2$ ($\theta_2 < 0°$). When the occupant leaves the seating assemblies 34, each motion mechanism MM causes its seat assembly 34 to return to its initial, unburdened orientation (FIG. 4).

The inventors have determined that preferably the total rocking angle or amount of total rock that the seat assembly 34 can be rocked through is approximately 60° (from an extreme rocked-backward position to an extreme rocked-forward position). If the amount of total rock is too small, the inventors believe the occupant will not receive sufficient exercise and range of motion in the pelvic and thigh areas to provide the benefits of enhanced circulation, flexibility, and alertness. If the amount of total rock is greater than approximately 60°, the inventors believe the occupant will be placed in unstable postures and this will produce additional stress on the muscles to maintain balance.

Figure 8:
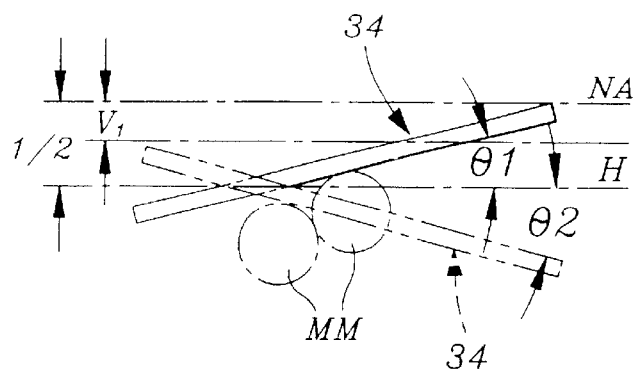
FIG. 8 is a symbolic representation of the motion mechanism MM and the seat assemblies, and shows the seat assemblies at different rocking angles ($\alpha_1$, $\alpha_2$) and with different amounts of vertical movement ($V_1$, $V_2$)

With reference to FIG. 8, although the vertical motion and rocking motion provided by the motion mechanism MM have been described separately, in actuality, these two motions are provided simultaneously by the motion mechanism MM. The seating assemblies 34 are shown with different vertical movements $V_1$, $V_2$, and different rocking angles $\theta_1$, $\theta_2$, respectively. The seat assemblies 34 might take this disposition when an occupant crosses his or her legs.

Figure 9A:
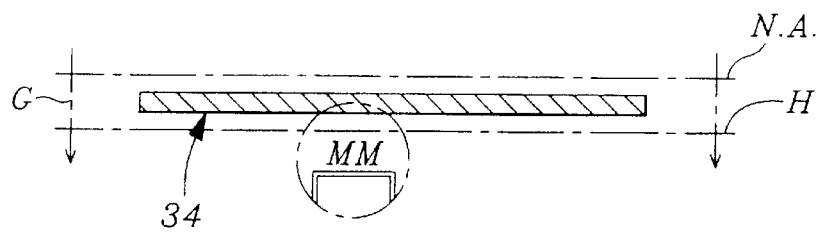
FIGS. 9A–9C are symbolic representations of the motion mechanism MM and the seat assembly, and show the seat assembly at various neutral angles ($\alpha$)
Figure 9B:
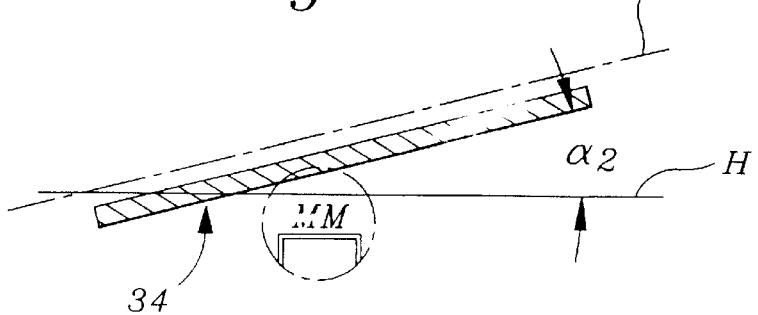
Figure 9C:
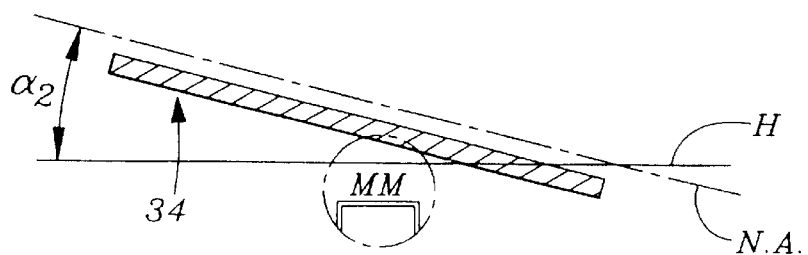

With reference to FIGS. 9A–9C, the inventors have recognized that to realize the aforementioned benefits from vertical motion and rocking motion in a two platform motion seat, which have not been achieved in a moving two platform seat for most seating applications in the past, each seating assembly 34 must be provided at a neutral angle $\alpha$ appropriate for the particular seating application or environment that the two platform motion seat 20 is incorporated into. The inventors have further recognized that the amount of rocking motion and vertical motion provided by the motion mechanism MM should depend on this neutral angle $\alpha$.

Figure 10A:
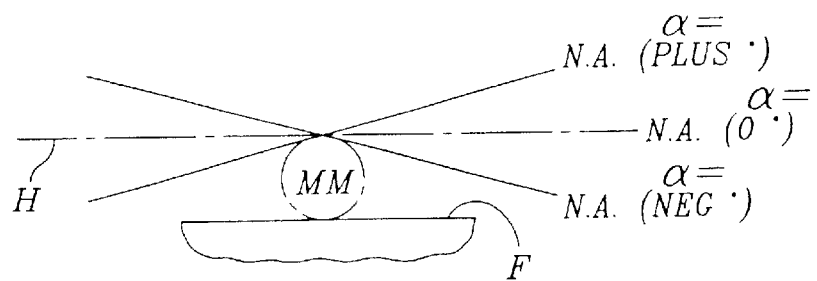
FIGS. 10A–10C are symbolic representations of the motion mechanism MM and the seat assembly, and show the seat assembly at various neutral angles and the foundation F at various angles.
Figure 10B:
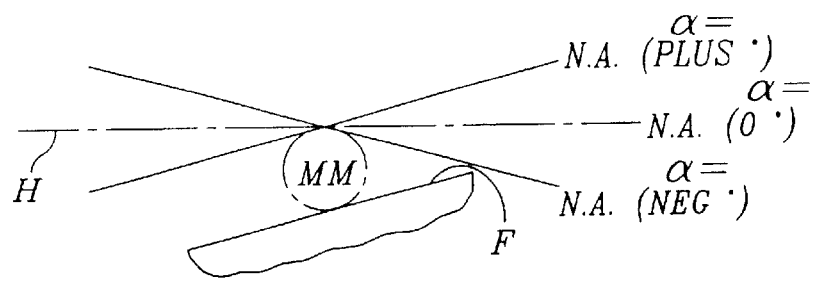
Figure 10C:
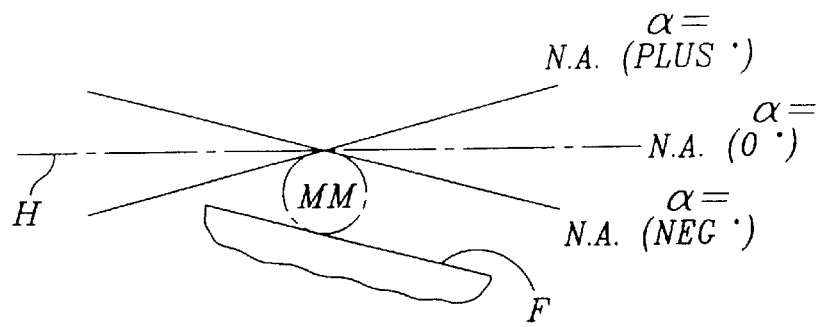

The neutral angle $\alpha$ is the absolute angle between the neutral angle disposition or line NA and an imaginary horizontal line H that resides at 0°. The neutral angle $\alpha$ is the angle that the seating assembly 34 initially is oriented at before any external forces, such as the weight of the occupant, are applied to the seat 20. The horizontal line H is orthogonal to earth's gravity force vectors G (FIG. 9A). Consequently, as illustrated in FIGS. 10A–10C, the orientation of the support 32 or foundation F is irrelevant in determining the neutral angle $\alpha$ because the neutral angle $\alpha$ is an absolute angle relative to the horizontal line H.

It will be apparent to one skilled in the art that the neutral angle disposition NA of the seating assemblies 34 may be provided in numerous ways such as, but not by way of limitation, altering the angle of the foundation or support 32, altering the connection of the motion mechanism MM with the foundation or with the bottom of the seat body 36, changing the construction or configuration of the motion mechanism MM, etc.

FIG. 9B illustrates the seating assembly 34 with a positive neutral angle $\alpha_1$ ($\alpha > 0°$). The inventors refer to seating applications with a positive neutral angle as leaned-back seating applications because the occupant predominantly sits in a leaned-back manner. FIG. 9C illustrates the seat assembly 34 with a negative neutral angle $\alpha_2$. The inventors refer to seating applications with a negative neutral angle as leaned-forward seating applications because the occupant predominantly sits in a leaned-forward manner.

The inventors have determined that, in general, the neutral angle $\alpha$ should vary from approximately negative 40° to approximately positive 30°. In some seating applications, the neutral angle $\alpha$ may exceed these parameters. For example, in a sit-stand chair, the neutral angle $\alpha$ may exceed approximately negative 40° (e.g. negative 45°, 50°, etc.). In more modern, super reclining office chairs, the neutral angle $\alpha$ may sometimes exceed approximately positive 30° (e.g. positive 35°, 40°, etc.). In most seating applications, if the neutral angle $\alpha$ exceeds approximately negative 40°, the occupant would not be able to derive sufficient benefit from the vertical movement in the seat because the majority of the occupant's weight would be on his/her legs rather than on the ischial tuberosities. Similarly, in most seating applications, if the neutral angle $\alpha$ exceeds approximately positive 30°, the occupant would not be able to derive sufficient benefit from the movement in the seat because the majority of the occupant's weight would be on his/her back rather than on the ischial tuberosities.

The varying of the neutral angle $\alpha$ for the two main types of seating applications, leaned-back seating (positive neutral angle seating) and leaned-forward seating (negative neutral angle seating) are described below.

It should be noted, although two main types of seating are described, in some seating applications, such as office seating, a seat may be adjustable so as to provide a positive neutral angle $\alpha_1$, and a negative neutral angle $\alpha_2$. This may be done with an adjustment mechanism (not shown) provided along the side of the seating assemblies 34, below the seating assemblies 34, etc., to vary the neutral angle $\alpha$ of the seat between a positive neutral angle $\alpha_1$ and negative neutral angle $\alpha_2$, including various positions therebetween.

Positive Neutral Angle Seating Applications

Positive neutral angle or leaned-back seating applications generally consists of three different types: 1) minimum neutral angle ($\alpha=0$ to 4°); 2) moderate neutral angle ($\alpha=0$ to 15°); and 3) maximum neutral angle ($\alpha=0$ to 30°).

The inventors have determined that the greater the neutral angle seating (i.e., moderate to maximum neutral angles), the greater the rocking movement and vertical movement should be in the seat assemblies 34 (It should be noted, the inventors have also determined the rocking movement and vertical movement should be relatively increased as cushion thickness increases). In this type of seating, the occupant is more reclined in the seat. This means less of the occupant's seated upper body weight is directed vertically downward on the spine and ischial tuberosities compared to minimum neutral angle seating where the occupant is essentially sitting vertically. Because of the smaller amount of stress on the spine and ischial tuberosities at this orientation, more movement, both vertical and rocking, is required in the seat assemblies 34 for the occupant to experience stress relief in the normally-affected areas of the body.

The inventors have determined that the smaller the neutral angle seating (i.e., minimum to moderate neutral angles), the smaller the rocking movement and vertical movement should be in the seat assemblies 34. In this type of seating, the occupant is sitting essentially upright. Thus, more of the occupant's upper body weight is directed vertically downward on the spine and ischial tuberosities. This greater stress means that only relatively small amounts of vertical and rocking movement are required for the occupant to feel stress relief in the normally-affected areas of the body.

The following identifies the desired parameters for rocking motion and vertical motion in the seat assemblies 34 for the different types of leaned-back seating applications:

1) Minimum Neutral Angle

In minimum neutral angle seating, the neutral angle $\alpha$ is relatively small ($\alpha=0$ to $4°$). Examples of this type of seating include, but not by way of limitation, office chair seating and task chair seating. Based on the above neutral angle range, the amount of total rock should be between approximately 5 and 10 degrees. If the amount of total rock is greater than approximately 10 degrees, the inventors believe the seating assemblies 34 will not adequately support the occupant, possibly resulting in an unstable posture that may produce additional stress on the muscles to maintain balance. If the amount of total rock is less than approximately 5 degrees, the inventors believe the occupant will not receive sufficient exercise and range of motion in the pelvic and thigh areas to provide the benefits of enhanced circulation, flexibility, and alertness. Based on this neutral angle range, the amount of vertical movement should be approximately 0.10–1.5 in. If the amount of vertical movement is less than approximately 0.10 in., the seat may feel too hard, creating too much static pressure on the ischial tuberosities, and likely provides insufficient movement to the pelvic bones to allow for proper adjustment of the spine, or to maintain a balanced weight distribution between the two ischial tuberosities. If the amount of vertical movement is greater than approximately 1.5 in., the seat may not feel like it is providing adequate support. This may result in unstable postures and/or the creation of additional stress on the muscles to maintain balance.

2) Moderate Neutral Angle

In moderate neutral angle seating, the neutral angle $\alpha$ is small to moderate ($\alpha=0$ to $15°$). Examples of this type of seating include, but not by way of limitation, motor vehicle seating such as automobile seating. Based on the above neutral angle range, the amount of total rock should be between approximately 3 and 20 degrees. If the amount of total rock is greater than approximately 20 degrees, the inventors believe the seating assemblies 34 will not adequately support the occupant, possibly resulting in an unstable posture that may produce additional stress on the muscles to maintain balance. If the amount of total rock is less than approximately 3 degrees, the inventors believe the occupant will not receive sufficient exercise and range of motion in the pelvic and thigh areas to provide the benefits of enhanced circulation, flexibility, and alertness. Based on this neutral angle range, the amount of vertical movement should be approximately 0.25–2.0 in. If the amount of vertical movement is less than approximately 0.25 in., the seat may feel too hard, creating too much static pressure on the ischial tuberosities, and likely provides insufficient movement to the pelvic bones to allow for proper adjustment of the spine and to maintain a balanced weight distribution between the two ischial tuberosities. If the amount of vertical movement is greater than approximately 2.0 in., the seat will not feel like it is providing adequate support. This may result in unstable postures and/or the creation of additional stress on the muscles to maintain balance.

In seating applications such as automobile seating, where the occupant may be sitting in one position for a long period of time, motion in the seat is especially important to inhibit the formation of venous clots in the legs (i.e., deep venous thrombosis). These blood clot formations occur more frequently in people with poor circulation (e.g., the elderly) who sit in a static position for long periods of time. Deep venous thrombosis is a serious problem because if the clot breaks off and travels through the circulatory system it can lead to greater problems such as a pulmonary embolism. Varying the neutral angle with the particular seating application, and providing the rocking motion and vertical motion parameters indicated above passively exercises the normally-affected seating areas of the occupant, improving circulation and reducing the risk of deep venous thrombosis.

3) Maximum Neutral Angle

In maximum neutral angle seating, the neutral angle $\alpha$ ranges from small to large ($\alpha=0$ to $30°$). Examples of this type of seating include, but not by way of limitation, recliner, theater, and airline seating. Based on the above neutral angle range, the amount of total rock should be between approximately 10 and 60 degrees. If the amount of total rock is greater than approximately 60 degrees, the inventors believe the seating assemblies 34 will not adequately support the occupant, possibly resulting in an unstable posture that may produce additional stress on the muscles to maintain balance. If the amount of total rock is less than approximately 10 degrees, the inventors believe the occupant will not receive sufficient exercise and range of motion in the pelvic and thigh areas to provide the benefits of enhanced circulation, flexibility, and alertness. Based on this neutral angle range, the amount of vertical movement should be approximately 0.5–4.0 in. If the amount of vertical movement is less than approximately 0.5 in., the seat may feel too hard, creating too much static pressure on the ischial tuberosities, and likely provides insufficient movement for the pelvic bones to allow for proper adjustment of the spine and to maintain a balanced weight distribution between the two ischial tuberosities. If the amount of vertical movement is greater than approximately 4.0 in., the seat will not feel like it is providing adequate support. This may result in unstable postures and/or the creation of additional stress on the muscles to maintain balance.

Negative Neutral Angle Seating Applications

Negative neutral angle or leaned-forward seating applications generally consist of moderate neutral angle to maximum neutral angle seating ($\alpha=0$ to $-40°$).

The inventors have determined that the larger the negative neutral angle seating (i.e., moderate to maximum negative neutral angles), the greater the rocking movement required, but the smaller the amount of vertical movement required. At moderate to maximum negative neutral angles, the legs of the occupant relieve more of the stress on the ischial tuberosities (i.e., receive a larger portion of the gravitation force) and provide some of the vertical movement required. Thus, less vertical movement is needed in the seating assemblies 34. Relatively large rocking motions are required to ensure the weight on the posterior is optimally distributed over the seating assemblies, and the muscles, tendons, and ligaments of the occupant are passively exercised. The smaller the negative neutral angle seating (minimum to moderate negative neutral angles), similar to positive neutral angle seating above, the smaller the amount of rocking motion and vertical motion required.

Moderate to Maximum Negative Neutral Angle

In moderate to maximum negative neutral angle seating, the neutral angle $\alpha$ ranges from small to large ($\alpha$=0 to −40°). Examples of this type of seating include, but not by way of limitation, sit-stand chair seating. Based on the above neutral angle range, the amount of total rock should be between approximately 10 and 60 degrees. If the amount of total rock is greater than approximately 60 degrees, the inventors believe the seating assemblies 34 will not adequately support the occupant, either barely or not supporting the occupant, or creating an unstable posture that may produce additional stress on the muscles to maintain balance. If the amount of total rock is less than approximately 10 degrees, the inventors believe the occupant will not receive sufficient exercise and range of motion in the pelvic and thigh areas to provide the benefits of enhanced circulation, flexibility, and alertness. Based on this neutral angle range, the amount of vertical movement should be approximately 0.1–1.5 in. If the amount of vertical movement is less than approximately 0.1 in., the seat may feel too hard, creating too much static pressure on the ischial tuberosities, and likely provides insufficient movement to the pelvic bones to allow for proper adjustment of the spine and to maintain a balanced weight distribution between the two ischial tuberosities. If the amount of vertical movement is greater than approximately 1.5 in., the seat will not feel like it is providing adequate support. This may result in unstable postures and/or the creation of additional stress on the muscles to maintain balance.

Providing the seating assemblies 34 at a specific neutral angle $\alpha$ based on the particular seating application and providing a specific amount of vertical motion and rocking motion based on the specific neutral angle $\alpha$ produces a dynamic seating surface that is specifically designed for each individual seating application. The specific neutral angle $\alpha$ of the seating assemblies properly orients the occupant so that he or she can take full advantage of the aforementioned benefits provided by the two types of motion in the seating assemblies 34.

The vertical motion along with the rocking motion provides the independent motion the pelvis requires to accommodate shifting weight on the ischial tuberosities, from buttock to buttock. This allows the pelvis to perform its role as the "fulcrum of the body" while seated, just as it does while standing, walking, or running. Combined, these motions serve to distribute the weight of the body being borne by the ischial tuberosities and the residual weight of the posterior and thighs optimally over the two seating surfaces, regardless of the position one is sitting in (one leg up, one leg down, both legs up, both legs down, legs crossed, etc.). These motions also cause exercising of the muscles, tendons, and ligaments in the lower back, pelvic, and thigh areas by causing muscle pumping action in these areas of the body. This promotes circulation, feeding nutrients, eliminating waste metabolites, and inhibiting leg swelling (edema), blood clotting, and other peripheral venous disorders. The movement also increases occupant alertness as afferent nerves send impulses to the central nervous system. Occupant comfort is also increased because the seat movement constantly redistributes pressures acting on the spine, joints, and tissue. The rocking motion also eliminates restricted circulation problems caused by a portion of the seating surface, especially the front edge, cutting into the posterior or thighs of the occupant.

With reference to FIGS. 11–19, numerous embodiments of the motion mechanism of the present invention will now be described. These motion mechanisms are preferably made of steel, plastic, or similar material. Where appropriate, like reference numbers with an "a," "b," "c," etc. suffixes have been used to indicate like parts previously described for ease of understanding.

Figure 11:
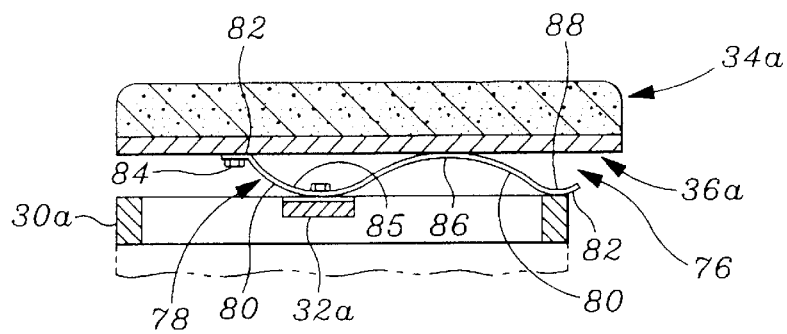
FIGS. 11–19 show alternative embodiments of the motion mechanism of the present invention.

With reference to FIG. 11, an embodiment of a motion mechanism 76 is disclosed. The motion mechanism 76 includes a spring 78 with a wave-like shape. The wave-like spring 78 includes a first crest portion 80 with a flange 82. The flange 82 includes a threaded fastener 84 for attaching the spring 78 to the seat body 36a of the seat assembly 34a. The spring 78 includes a first trough portion 85 that rests upon the lateral support 32a. The first trough portion 85 is attached to the support 32a with a threaded fastener. The wave-like spring 78 also includes a second crest portion 86, which supports another area of the seat body 36a and a second trough portion 88 that rests upon one of the aforementioned aprons 30a.

Figure 12:
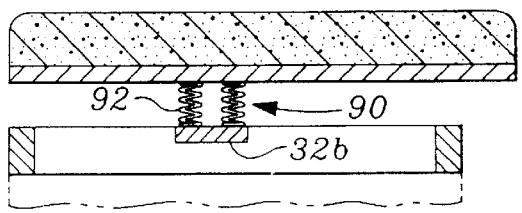

With reference to FIG. 12, a motion mechanism 90 constructed in accordance with an additional embodiment of the invention is shown. The motion mechanism 90 includes a pair of helical springs 92 that rest upon the lateral support 32b. The springs 92 may be varied by size or type to obtain the desired amount of rocking and vertical motion.

Figure 13:
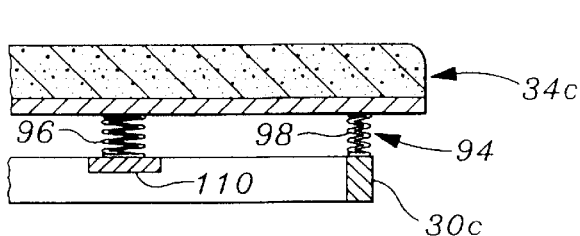

With reference to FIG. 13, a motion mechanism 94 constructed in accordance with an additional embodiment of the invention is shown. The motion mechanism 94 includes first and second springs 96, 98, respectively. The first spring 96 rests upon a rigid base 110 and supports a rearward portion of the seating assembly 34c. The second spring 98 rests upon the apron 30c and supports a forward portion of the seat assembly 34c. As mentioned above, the size and types of the springs 96, 98 may be varied to obtain the desired amount of rocking and vertical motion.

Figure 14:
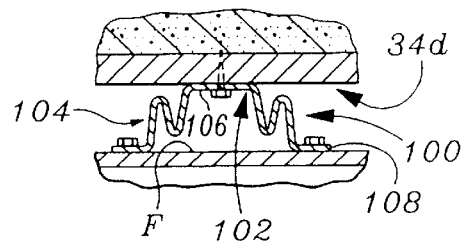

With reference to FIG. 14, a motion mechanism 100 constructed in accordance with an additional embodiment of the invention is shown. The motion mechanism 100 includes a main body portion 102 and a pair of leg portions 104. The main body portion 102 includes a flat plate 106 that supports the seat assembly 34d. The flat plate 106 of the motion mechanism 100 is attached to the seat assembly 34d with a threaded fastener or similar fastening means. The leg portions 104 have a sinusoidal-like shape and terminate in respective flanges 108. The flanges 108 are connected to a foundation F with threaded fasteners.

Figure 15:
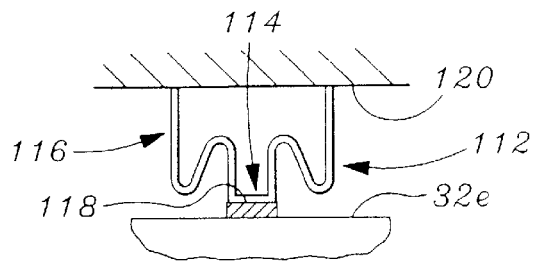

With reference to FIG. 15, a motion mechanism 112 constructed in accordance with an additional embodiment of the invention is shown. The motion mechanism 112 is the same as the motion mechanism 100 described above, except its orientation is reversed. The motion mechanism 112 includes a main body portion 114 and a pair of leg portions 116. The main body portion 114 includes a flat plate 118 that rests upon the support 32e. The flat plate 118 is connected to the support 32 with a threaded fastener or similar fastening means. The leg portions 116 have a sinusoidal-like shape and terminate in respective flanges 120. The flanges 120 are connected to the underside of the seat assembly 34e with threaded fasteners or similar fastening means.

Figure 16:
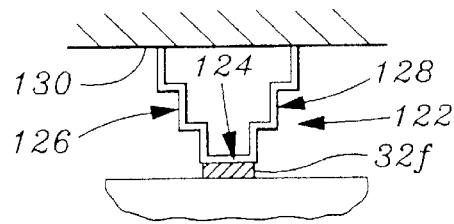

With reference to FIG. 16, a motion mechanism 122 constructed in accordance with an additional embodiment of the invention is shown. The motion mechanism 122 includes a main body portion 124 that rests upon the lateral support 32f. The main body portion 124 is attached to the lateral support 32f with threaded fasteners or similar fastening means. A pair of step-shaped leg portions 126, 128, respectively, extend from opposite sides of the main body portion 124. The step-shaped leg portions 126, 128 terminate in flanges 130. The flanges 130 support the seat assembly 34 and are connected thereto with threaded fasteners or similar fastening means.

Figure 17:
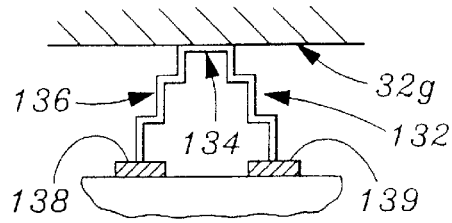

With reference to FIG. 17, a motion mechanism 132 constructed in accordance with an additional embodiment of the invention is shown. The motion mechanism 132 is the same as the motion mechanism 122 described above, except its orientation is reversed. The motion mechanism 132 includes a main body portion 134 that supports the seat assembly 32g. A pair of step-shaped leg portions 136 extend from opposite sides of the main body portion 134 and terminate in a pair of flanges 138. The flanges 138 rest upon a pair of lateral supports 139.

Figure 18:
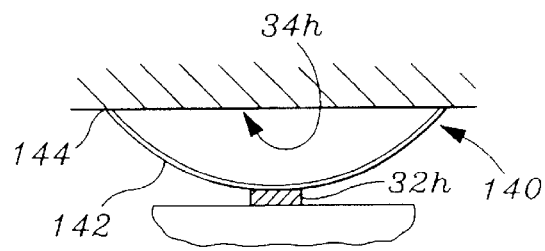

With reference to FIG. 18, a motion mechanism 140 constructed in accordance with an additional embodiment of the invention is shown. The motion mechanism 140 includes an elongated, upward-facing, arch-shaped member 142 or leaf spring that terminates at opposite ends in flanges 144. The flanges 144 support the seating assembly 34h and are connected thereto with threaded fasteners or similar fastening means. The motion mechanism 140 is connected to the lateral support 32h at its midpoint.

Figure 19:
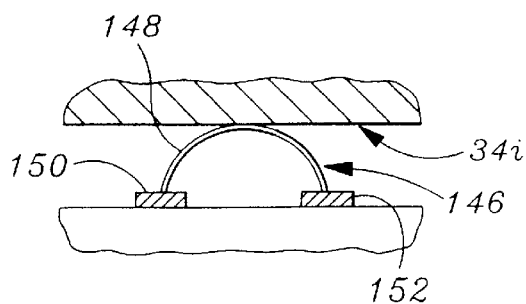

With reference to FIG. 19, a motion mechanism 146 constructed in accordance with an additional embodiment of the invention is shown. The motion mechanism 146 is similar to the motion mechanism 140 described above, except its orientation is reversed. The motion mechanism 146 includes an arch-shaped member 148 that terminates at opposite ends in flanges 150. The flanges 150 rest upon respective lateral supports 152 and are connected thereto. The arch-shaped member 148 is connected to seat assembly 34i at its apex.

The ideal location in the seat 20 for the occupant to sit is called the ischial tuberosities target area. This is the area of the seating assembly 34 where an occupant's ischial tuberosities ("seat bones") should be placed to obtain maximum comfort, optimal movement, and to obtain the greatest weight distribution benefit. This area is positioned approximately over the motion mechanism and extends longitudinally approximately the distance between the flanges or contact points between the motion mechanism and the seat assembly 34. The size of the ischial tuberosities target area depends on the size and construction of the motion mechanism. The ischial tuberosities target area ideally extends up to 5 in. longitudinally forward and rearward (10 in. total) from the point in the seating assembly over the center of the motion mechanism and can extend transversely as wide as the seating assembly 34.

The ischial tuberosities target area was much smaller in rocking seats of the past. Some of these seats included an arch-shaped assembly that attached to the seat at its apex. The apex narrowly defined the ischial tuberosities target area because an occupant had to be seated approximately directly over the apex to take full advantage of the comfort provided by the motion of the seat. This was sometimes difficult because every occupant has a different seating position. A number of the motion mechanism embodiments of the present invention (See FIGS. 11, 13, 15, 16, 18) expand the ischial tuberosities target area because they longitudinally extend the target area to approximately the distance between the flanges or contact points. The larger target area ensures that the occupant sits in the proper area of the seat to achieve maximum comfort and other benefits described above.

Figure 20:
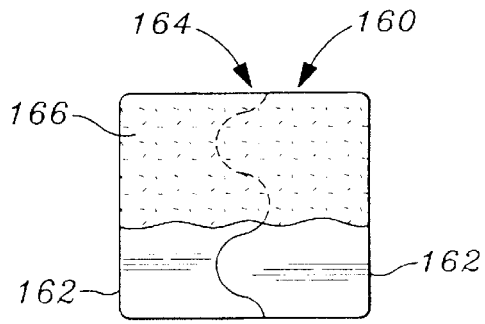
FIG. 20 shows a top plan view of an alternative embodiment of the seat assemblies of the two platform motion seat having a serpentine separation boundary.
Figure 21:
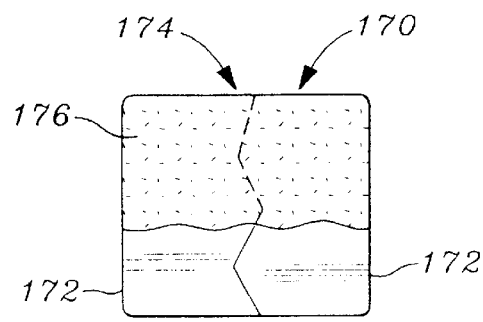
FIG. 21 shows a top plan view of an alternative embodiment of the seat assemblies of the two platform motion seat having a gently saw tooth separation boundary.

With reference to FIGS. 20 and 21, and initially to FIG. 20, a pair of seat assemblies, indicated generally by the reference numeral 160 and constructed in accordance with an alternative embodiment of the invention, will now be described. The seat assemblies device 160 consist of a pair of seat platforms 162 meshed or dove-tailed together at a mesh area 164. Although meshed together, the seat platforms 162 still rock, move vertically, and are provided at a neutral angle in the same manner as that described above. The mesh area 164 has a sinusoidal shape.

Both meshed seat platforms 162 are covered by a single cushion and/or upholstery 166. Meshing the seat platforms 162 and covering them with a single cushion and/or upholstery 166 still provides all the benefits described above relating to providing a neutral angle and two types of motion in the seat assemblies, and eliminates any demarcation or visible split between the seat assemblies. Eliminating this split makes the visible upper surface of the seat more aesthetically appealing, prevents crumbs and other debris from collecting in the crevice formed by this split, and prevents the occupant from getting his or her fingers, hands, arms, legs, or clothing caught in this area.

With reference to FIG. 21, an alternative embodiment of a pair of seat assemblies 170 is shown. The seat assemblies 170 consist of a pair of seat platforms 172 that are meshed or dove-tailed together at a mesh area 174. The mesh area 174 has a toothed design. The seat platforms also may be covered by a single cushion and/or upholstery 176.

It should be noted, in another embodiment of the invention, the seat platforms 36 illustrated in FIG. 2 may be covered with a single cushion and/or upholstery 166 to provide the advantages mentioned above. This construction may provide more of a demarcation between the seat platforms 36 than the dove-tailed seats 160, 170, but still makes the visible upper surface of the seat more aesthetically appealing, prevents crumbs and other debris from collecting in the crevice formed by a split seat assembly, and prevents the occupant from getting his or her fingers, hands, arms, legs, or clothing caught in this area.

Referring to FIG. 22, an exploded view of a version of the invention hereinafter referred to as a modular or portable seat system, or simply portable seat 201, is seen. The term "portable" refers only to the grouping of the structures in that they can be utilized as a carry along structure by a user to be introduced onto any surface of sufficient integrity to support the human body in a seated position, or in that they can be utilized as an installable component into or onto other seating configurations. The use with other seating configuration environments lends great flexibility in configuring a larger seating module not only with respect to characteristics of a specific user as adjustable on a particular structure, but also where different particular structures having their own overall characteristics can be substituted within a given seating configuration environment. Of the two main seat bodies, one has been removed in order to refrain from overcrowding the FIG. 22 and thus to facilitate discussion of the components shown. Beginning at the bottom of the FIG. 22, a base 203 is shown as having a series of reinforcing raised flange portions 205 of varying height as well as other structures for supporting various components making up the seat 201. The material from which the base 203 is constructed, in combination with the raised flange portions 205 can enable a wide variety of hardnesses and different configurations of flexibility. Where the material is hard, the raised flange portions 205 may be configured to compensate for irregular surfaces. Where a host seating environment requires it, the material may enable the base 203 to be deformed and to "snap" at the edges into a complementary holder. In other instances where a seating environment will permit greater depth for support of the structures which the base 203 supports, the base 203 can be shaped to accommodate such additional depth spaces and which may be of a variety of shapes. Further, the shapes may be chosen to enhance the operability of the seating environment into which it is placed, such as auditorium seating where greater depth is possible, especially at the rear of seating due to the pivoting nature of such seating environment. A two stepped outer flange includes a first wall 207 which rises from a base surface 209. The first wall 207 leads to an intermediate extension 211, and then to an upper wall 213. It is understood that base 203 need have no flange, or it may have other structure, especially as will interact and interfit with other seating environments.

Carry handle 215 is located at a rear end of the base 203 and is useful not only in carrying the portable seat 201, but also in orienting the observer to the rear of the seat 201. Base 203 has a number of other structural features for facilitating the support of operative structures. A series of preferably integrally formed spring support plugs 217 are used to engage a series of coil springs 219. The coil springs 219 are preferably guide wrapped around the plugs 217 and rely upon the radial twist tension of the springs 219 and a linkage and motion guidance system, to be described, to hold them in place. Coil springs 219 may be interchangeable for different weight ranges of persons as well as personal preferences. There are four of the spring plugs 217 seen on each side of the base 203, and four of the springs 219 are seen on the far half section of the base 203. Springs 219 form the force members for providing resistance throughout the full displacement in the seating.

Secondary engagement members are seen in the form of elastomeric members 225 which may be hollow, depending upon the material chosen for construction and thus the deformation force characteristics. The outer shape of the elastomeric members 225 are as bullet shaped members having an upper hemispherical shape. The elastomeric members 225 have a base section 227 which may be made of a different material, perhaps integrated into the upper body of the elastomeric members 225 to give a great variety in force resistance versus deformation. The base section 227 includes a pair of outer mounting ears 229 having apertures for engagement with a complementary pair of short projections 231 seen on the base 203. The short projections 231 lie on either side of a circular projection 233. The ears 229 can be held down with either rivets or screws. The hold down force is not expected to be significant, only such as will hold the elastomeric members 225 against their own weight and tipping force.

At the front side of the base 203, two large multiple concentrically raised circular projections 235 provide a reduced frictional base for rotation of a multiple height member displacement rotatable limiting wheel 237, one of which is shown on the far side of the base 203. The displacement limiting wheel has a series of four different height structures placed along its mid-circumference, with one of the structures being simply the base. The other three structures are cylindrical projections 239, with each cylindrical projection 239 slightly higher than the next most adjacent area. The multiple height member displacement rotatable limiting wheel 237 will be shown to underlie a downwardly directed deformation member over a portion of its extent so as to bring one of the cylindrical projections 239 underneath the downwardly directed deformation member. The higher the projection 239, the earlier during the downward path of travel of the deformation member will begin engagement of the projection 239. Turning of the multiple height member displacement limiting wheel 237 is accomplished by the user through the bottom of the base 203, as will be shown.

Also seen are a series of four, in-place low height limiting structures 241 which both double as retractable leg storage spaces and act as ultimate travel limiters in order that the coil springs 219, elastomeric members 225 and other force resistance members are not damaged by over compression.

The center of the base 203 includes a flattened area 245 having a pair of open ended bores 247. The open ended bores 247 accommodate a plate 249 having projections 251 and which is shown below the base 203 and can be sued for a variety of purposes such as identification where the seat 201 is completely portable, or for affixing the seat 201 to some other structure.

Also seen on each of the halves of the base 203 are a grouping of four bosses 255 each having a central aperture for mounting threaded members or screws from the bottom side. The bosses 255 are arranged in pairs, each pair of which is to accommodate a support 257 seen in exploded fashion above the base 203. Each side of the base 203 supports two of the supports 257, which between them support a main pivot pin 259.

Main pivot pin 259 engages both a flat "A" shaped lateral support 263 and a "Y" shaped lateral support 265, both of which act as guidance tracking linkages and produce a motion which will be seen from the details of their operation, as well as to laterally constrain the seat members, including seat member 321 from movement in a direction toward each other. Thus, the flat "A" shaped lateral support 263 and a "Y" shaped lateral support 265 become a part of the motion mechanism of the invention, along wit the springs 219, elastomeric members 225, and more. The "A" shaped lateral support includes a first side support 271 and a second side support 273 which are connected by an upper end lateral member 275 and a mid section lateral member 277. The upper end lateral member is hollow cylindrical and has a bore 279 in order to support and engage an upper pivot pin 281. The ends of the first and second side supports 271 and 273 include short bores 283 and 285 respectively for insertion of the main pivot pin 259. The exploded nature of the view of FIG. 22 obscures the fact that the supports 257 lie between the supports 263 and 265, and are pivotably joined by pivot pin 259 and act as upward stops for their angular displacement.

The "Y" shaped lateral support 265 includes a relatively wide centrally located main member 291, a main cross member 293, and pair of upright supports 295 and 297 which extend from the ends of the cross member 283. The end of the main member 291 includes a short bore 299 for accommodating the main pivot pin 259. The main pivot pin 259 extends through the short bore 283 of the first side support 271 of the flat "A" shaped lateral support 263, and then through the short bore 299 of the "Y" shaped lateral support 265, and then through the short bore 285 of the second side support 273 of the flat "A" shaped lateral support 263 to effectively trap, the main member 291 between the first and second side supports 271 and 273, and to prevent any appreciable lateral motion of the "Y" shaped lateral support 265. Also seen is a pivoting structure as a pivot pins 301 for engaging short bores 303 at the end of the upright support 295, and an short bore at the end of the upright support 297.

Above the "A" shaped lateral support 263 and the "Y" shaped lateral support 265 a short fitting 311 and a long fitting 313 are seen. Short fitting 311 has mounting apertures 315 while long fitting 313 has mounting apertures 317. Another short fitting 311 and another long fitting 313 exist opposite the fittings 311 and 313 seen, but are obscured by seat member 321. The opposite side of the fitting 313 includes a guide slot for engaging the ends of the pin 301. Fitting 311 has no slot and actually guides the fitting 311 very slightly forward toward the forward end of the base 203 as the fitting 311 is displaced downwardly and stabilizes the front end of the seat 201 to also displace only slightly forwardly as it is compressed. The other two fittings 311 and 313 not seen also have slots for engaging the other ends of the pins 281 and 301.

Thus the fittings 311 and 313 are guide members which enable displacement of the upper ends of the "A" shaped lateral support 263 and the "Y" shaped lateral support 265 in a guided fashion to permit some forward and rearward movement of the seat member 321, but which will restrict to a great extent any tendency for lateral movement.

The seat member 321 has a longer dimension terminating at a rearward end 323 opposite a forward end 325, which is sometimes popularly referred to as a "waterfall edge". The seat member is somewhat cup shaped having a main planar extent 327 overlying a downwardly curving side wall 329 which extends down at different angles. The curving side wall 329 extends more straightwardly down along the side adjacent the other seat member 321 not present in FIG. 22, but slopes gently forward at the front end 325 to help gently taper off of the support for the leg at front end 325.

A series of slots 331 may be formed in the seat member 321 to encourage some selective bending in one or a number of directions about the middle of the seat member 321. As will be seen, it can be helpful to go so far as to hinge the seat member 321 so that a forward portion of the seat member 321 can move independently from a rearward portion, and for cradling. Both, in the case of a one piece seat member 321 depend upon the material selected. A material such as polypropylene will bend based upon its thickness, the length and thickness of the curving sidewall 329 and the overall dimensions of the seat member 321. The slotting 331 runs laterally in two sets, but could be made to run longitudinally with respect to front end 325 and rearward end 323. By beginning to de-couple the force distribution between the front and rear of the seat 201, the rear portions of the seat member 321 can better and more readily adjust its position, or "give" in order to make a more comfortable seat.

Overlying the seat member 321 is a padding cover 335 having a lower edge 337 shown in dashed line format. The lower edge 337 illustrates that the padding cover 335 has the ability to envelop the outer extremes of the seat member 321. This envelopment can be used to secure further padding between the padding cover 335 and the seat member 321, if desired, without the need for further attachment structure between such padding and either the padding cover 335 or the seat member 321. Beneath the bottom of the base 203 is a detachable foot 339, as well as small attachment members 341 and a long attachment member 343.

Figure 23:
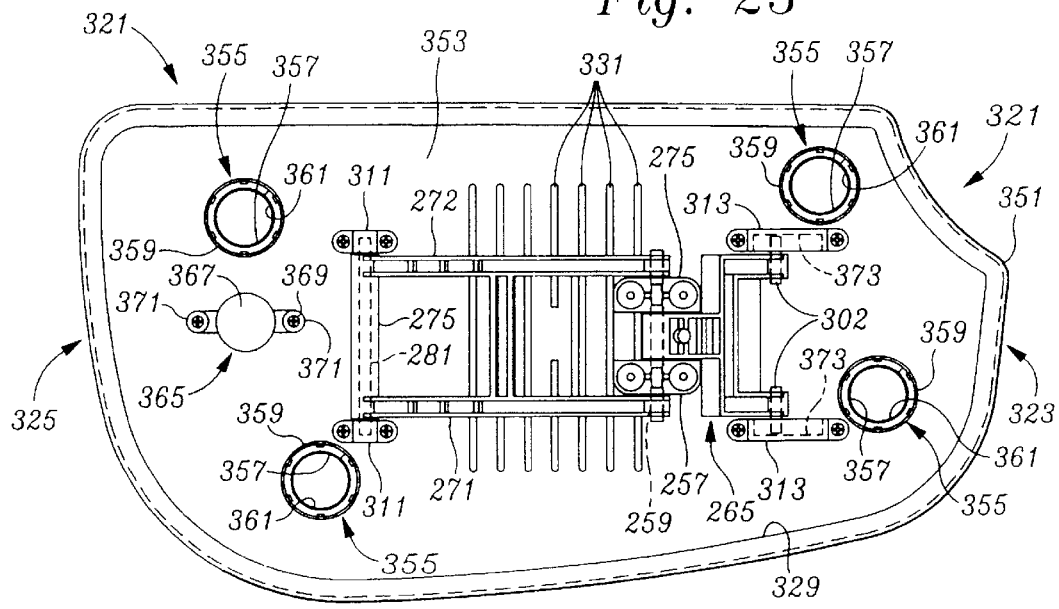
FIG. 23 is an underside view of one of the two platforms of FIG. 22 showing attachment of support components.

Referring to FIG. 23, an underside view of the seat member 321 gives an impression of the thickness of the downwardly curving side wall 329 and as can be seen, it terminates at an edge 351. A short pair of pivot pins 302 are substituted for the long pivot pin 301 seen in FIG. 22. Within the confines of the side wall 329, a generally flat surface 353 is seen.

From the flat surface 353, a number of structures arise to accommodate the fit and operability of the seat member 321. A series of four spring lock structures 355 are seen as an inner ring 357 surrounded by an outer ring 359. The outer ring 359 has a series of inwardly directed lock structures 361 for snapping onto and retaining the tops of coil springs 219.

At the left of FIG. 23, and most closely adjacent front end 325 is a smaller more hardened elastomeric member 365. Hardened elastomeric member 365 is also bullet shaped and has a curved main portion 367. A smaller diameter, somewhat more abruptly hardened form enables it to be used in conjunction with the multiple height member displacement limiting wheel 237. The relatively small differences in height of the cylindrical projections 239, in order to be selectable to correspondingly limit the displacement of the seat member 321 should not be as deformable and should not significantly spreadably displace. Curved main portion 367 sits atop a should ideally sit atop a base section 369 including ear sections 371 having apertures for screws or threaded members shown which are used to attach the smaller more hardened elastomeric member 365.

Shown attached to the bottom of the seat member 321 is the assembled lateral stability components seen in FIG. 22, including two supports 257, main pivot pin 259, flat "A" shaped lateral support 263, "Y" shaped lateral support 265, and especially fittings 313 and 311. For the first time, fitting 313 is seen as having a slot 373.

The assembled stability and tracking linkage components clearly indicate that displacement of the supports 257 toward the flat surface 353 will result in a strict pivot motion with respect to the flat "A" shaped lateral support 263 pinned to the seat member and thus some rearward displacement of the support 257 which, when the support 257 is securely supported by the base 203 results in a forward displacement of the seat member 321. However, since the, slot 373 enables such rearward motion, relative rearward displacement of the support 257 and the "Y" shaped lateral support 265 is accommodated.

Figure 24:
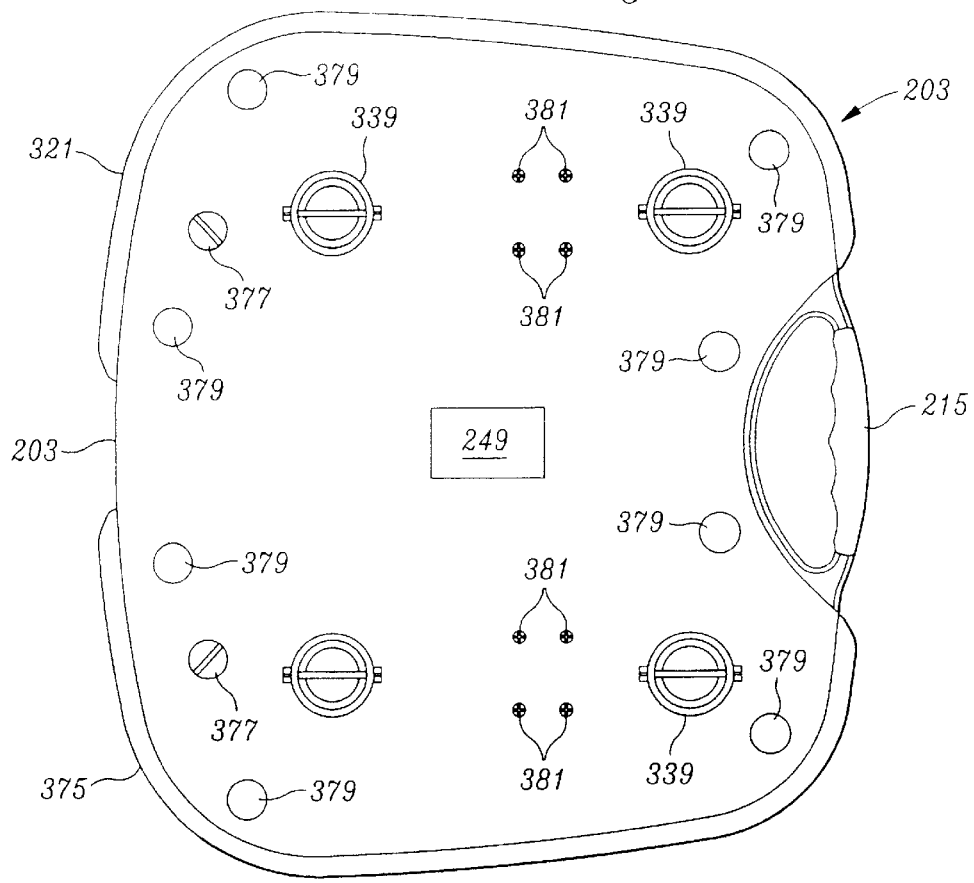
FIG. 24 is an underside view of the lower platform of the seat of FIGS. 22 and 23 and illustrating the storage extension support legs and resistance adjustments.

Referring to FIG. 24, a bottom view of the base 203 is seen. Overlying the base is the seat member 321 and in addition a second seat member 375. A pair of circular slotted members 377 are each operably connected to a respective one of the multiple height member displacement limiting wheel 237 to enable the height displacement of the first and second seat members 321 and 377. A series of circular bore structures 379 are seen as simply mold displacement structures which correspond to the rising points of location of the series of preferably integrally formed spring support plugs 217. The accommodation plate 249 is also seen as are small threaded members 381 which hold the support 257 in place.

Figure 25:
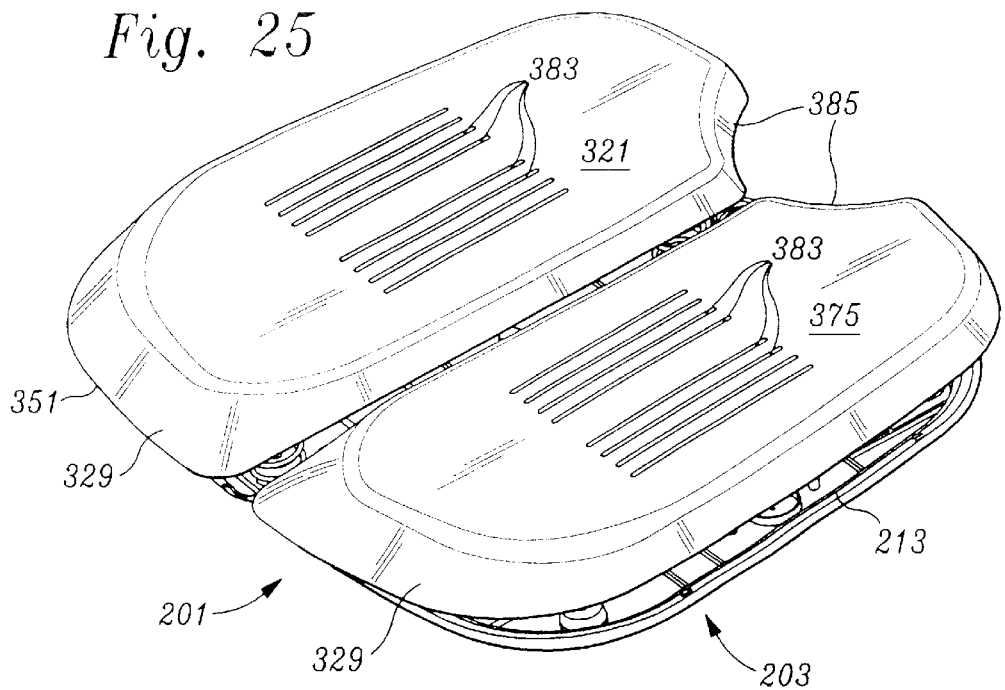
FIG. 25 is an assembled view of the seat of FIGS. 22–24 with both platforms in place.

Referring to FIG. 25, a view of the seat 201 as assembled without the padding cover 335 is seen with the first and second seat members 321 and 375 in normal operational position. The components and portions of the second seat member 375 is the same as was seen for seat member 321, except that the slots 331 which extended laterally with respect to the first and second seat members 321 and 375 are replaced by slots 383 which extend longitudinally. Any other combination of ventilation or strength enhancing or weakening or surface conforming structures are possible. Also seen is an accommodative space formed through two indentive shapes 385, one for each of the first and second seat members 321 and 375 and which both enable the user of the portable seat 201 access to the carry handle 215, as well as serving as a support free area for relief of pressure which would otherwise apply to the ischial tuberosities. As can be seen in FIG. 25, some of the inside of the base 203 can be seen.

Figure 26:
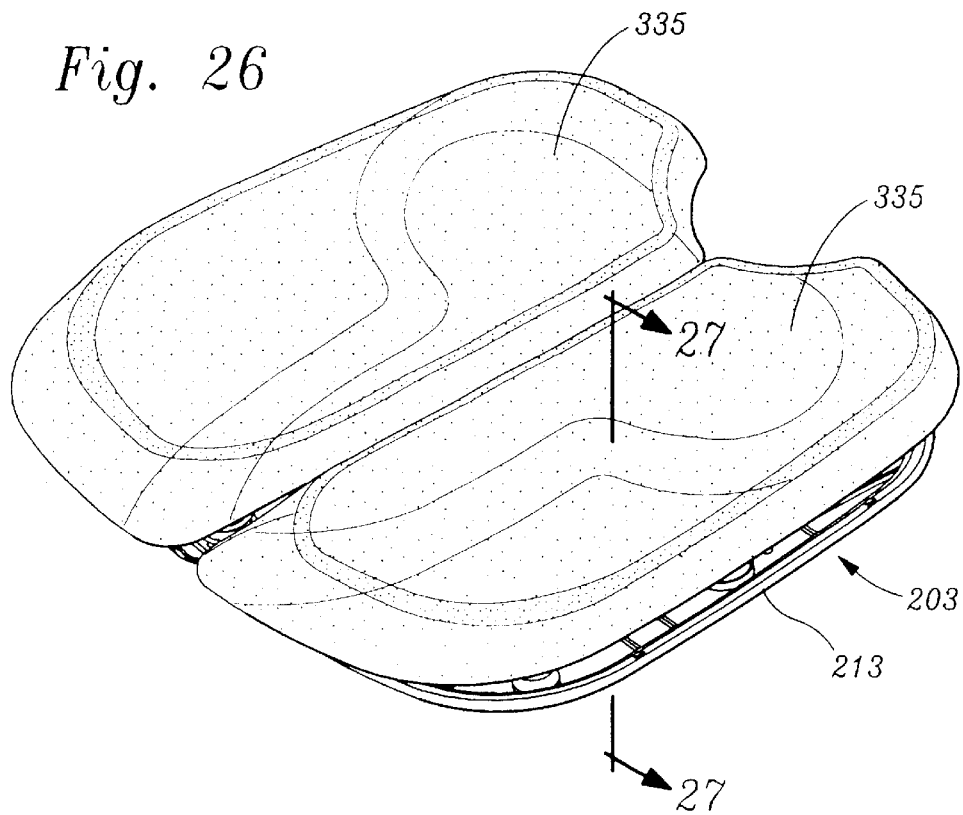
FIG. 26 is an appearance seen with the cushioning components of the two platform seat of FIGS. 22–25 in place and showing the generalized finished appearance of the seat, but without an encasement cover.

Referring to FIG. 26, a view as in FIG. 25 is seen but with the padding cover 335 in place. FIG. 26 also references the sectional view taken along line 27—27 which is placed in order to give a better view of the action of the seat member 375 in its upward and downward movements to illustrate the internal workings thereof.

Referring to FIG. 27, a side partial view of the seat 201 of FIGS. 22–26 illustrates seat 201 at rest, namely with its seat member 375 in its uppermost position with coil springs 219 fully expanded and with the "A" shaped lateral support 263, and "Y" shaped lateral support 265 now seen as the elements which also, depending upon selection of the material and characteristics of the coil spring 219, may help hold the seat member 375 in place vertically, preventing motion away from the base 203, although the attachment and placement of the coil springs 219 are expected to bear either most of or all of this force duty.

In addition, greater detail is seen in terms of the interaction between the low height limiting structures 241 and the detachable foot 339. As can be seen, the low height limiting structures 241 are formed into the material from which the base 203 is made to the extent which will accommodate the detachable foot 339 in either a downward extended orientation or in an upward storage orientation. Nearer the forward end 325, the detachable foot 339 is seen as inserted into the inside structure 241 to thus fit the foot 339 oppositely within the structure 241 to thus leave no downward projection. This enables both a flat surface on the bottom of the base 203, as well as storage for the foot 339.

Deployment of the foot 339 is best seen circular structure of the foot 339 nearer the rearward end 323. Here, the foot 339 has been removed from the structure 241, inverted, and re-inserted such that a main portion of it protrudes downwardly. As can be seen, the structure 241 has a stepped circular surface 387 which is complementary to a circular surface 389 on the foot 339. The stepped surface 387 of the circular bore structures 379 engages a rim surface 391 of the detachable foot 339 when it is inverted as seen at the rearward end 323 of the seat 201 and causes a cylindrical portion 393 to protrude from the bottom of the base 203.

Referring to FIG. 28, a view similar to that seen in FIG. 27 is seen when the seat member 375 is displaced partially toward the base 203 in an even fashion. Please note that even displacement need not be the rule. The pivot pins 302 is seen as occupying a different position in the slot 373 due to the angular displacement of the "Y" shaped lateral support 265. The previous upper position of the second seat member 375 is shown in phantom and in regular line drawing to illustrate the only slight movement in the direction of the forward end 325. Note also the compression of the coil springs 219. Not as illustrable in FIG. 28 is the flexion of the middle of the second seat member 375. Much of the flexion depends upon the material of construction and the number and orientation of slots 331. Since the a "A" shaped lateral support 263 is pivotably connected to the seat member 321, the seat member's forward to rear angular displacement is possible, in addition to its up and down motion, as well as slight forward and rearward translation. As such, both up and down movement, as well as rocking movement, as well as front to rear translation occurs. The "Y" shaped lateral support 265, because it is translatably mounted to the seat member 321 generally follows the lead of the "A" shaped lateral support 263, and generally acts to prevent, within certain limits, side to side movement so that a pair of seating members will not interfere with each other. Because the seat 201 may be portable, but can be attached to an office/task chair station, or built to fit either permanently or temporarily into any seating environment, and having its own base, the angular displacement may not be as great as for non-portable seating and is expected to be within about 40°. The up and down displacement is believed to be within about four inches, depending upon the size of the seat 201.

Referring to FIG. 29, a side view of the "Y" shaped lateral support 265 is seen in isolation. Seen are the relatively wide centrally located main member 291, main cross member 293, upright support 297, short bore 299 and short bore 305. FIG. 30 is a plan view of the "Y" shaped lateral support 265 with a clearer view of the main member 291 and showing its reinforcing ribs 397 which increase rigidity. Further, the pair of upright supports 295 and 297 support a planar member 399 therebetween to further increase the rigidity and twist resistance of the pair of upright supports 295 and 297. FIG. 31 is a sectional view taken along lines 31—31 of FIG. 30 and further illustrates the dimensional consistency of the reinforcing rib 397 with the I-beam shape of the main cross member 293, and the continuity of the planar member 399. FIG. 32 is a top view and illustrates the extent to which the planar member 399 bisects the main cross member 293.

Referring to FIG. 33, an end view of the long fitting 313 illustrates a side hold down portion 401 and a top curved portion 403. Referring to FIG. 34, a top view of the long fitting 313 shows the extent of the top curved portion 403. Apertures 405 are used to attach the long fitting 313 to the first and second seat members 327 and 375. Referring to FIG. 35, a sectional view taken along line 35—35 of FIG. 34 illustrates the slot 373 in which the end of the pivot pin 301 is guided as the end of the "Y" shaped lateral support translates. Referring to FIG. 35, a sectional view taken along line 36—36 of FIG. 34 illustrates a hollow space underneath the apertures 405.

Referring to FIG. 37, members of the linkage guidance system include a side view of the "A" shaped lateral support 263 is seen in isolation. Seen are the first side support 271, and bores 279 and 283 for engaging pivot pins 281 and 259, respectively. Referring to FIG. 38, seen are first side support 271, second side support 273, upper end lateral member 275, mid section lateral member 277, and a reinforcing planar member 411 which further increase the rigidity and twist resistance of the side supports 271 and 273. FIG. 39 is a sectional view taken along lines 39—39 of FIG. 38 and further illustrates the dimensional consistency of the reinforcing planar member 411 with the mid section lateral member 277. FIG. 40 is a sectional view taken along lines 40—40 of FIG. 38 and further illustrates the I-beam nature of the side supports 271 and 273. FIG. 41 is a sectional view taken along lines 41—41 of FIG. 38 and further illustrating the bore 279 which engages the pivot pin 281.

Referring to FIG. 37, one of the supports 257 seen in FIG. 1 will be shown in further detail. Note that the supports 257 of FIG. 1 are mirror images of each other and only one of the mirror image versions will be examined. Support 257 includes a base 415 having a pair of mounting apertures 417. Base 415 has a flat side 419 and a curved side 421. A central area 423 includes a first side block 425 adjacent flat side 419 and a second side block 427 adjacent curved side 421 and separated by a central portion 429 having a rounded top. Side blocks 425 and 427 act to limit the upward angular displacement of the "A" shaped lateral support 263 and "Y" shaped lateral support 265. Side block 425 is taller than side block 427 in order to enable the "Y" shaped lateral support 265 to have a higher angular displacement.

Referring to FIG. 43, a side view facing the side block 427 illustrates a downwardly disposed stop ledge which includes an angular stop ledge 431 and a short length of flat stop ledge 433. Flat stop ledge 433 is generally parallel to a bottom 435 of the side block 427. Also seen are bosses 437 surrounding the mounting apertures 417. The apex between the short length of flat stop ledge 433 and the angular stop ledge 433 is located at a point close to a bore 437 through which the main pivot pin 259 will extend. Both of the ledges 431 and 433 extend inward to a back wall 439 from which the main pivot pin 259 will emerge and whose inward location enables definition of the ledges 431 and 433.

Referring to FIG. 44, a side view facing the side block 425 illustrates a downwardly disposed stop ledge which includes an angular stop ledge 441 and a short length of flat stop ledge 443. Flat stop ledge 443 is generally parallel to bottom 435 of the side block 425. Also seen are the bosses 437. The apex between the short length of flat stop ledge 443 and the angular stop ledge 443 is located at a point close to the bore 437 which was also seen in FIG. 43. Both of the ledges 441 and 443 extend inward to a back wall 445 from which the main pivot pin 259 will emerge and whose inward location enables definition of the ledges 441 and 443.

Referring to FIG. 45, an end view of the side block 425 illustrates angular stop ledge 441 and short length of flat stop ledge 433 as well as the rounded top of the central portion 429. Referring to FIG. 47, a bottom view illustrates all of the angular stop ledges 441 and 431 and the short length of flat stop ledges 433 and 443. Also seen is a drainage structure 449 which "opens up" a space adjacent the bottom surface 435 to enable any entrapped moisture to drain away from any threaded members or connectors extending through mounting apertures 417.

Referring to FIG. 47, a sectional view taken along line 47—47 of FIG. 46 illustrates the configuration of the center of the support 257.

Referring to FIG. 48, a top view of the short fitting 311 along with its mounting apertures 315 are seen. A curved central portion 451 is seen, as is a base portion 453. Referring to FIG. 49 a side view is seen along with curved central portion 451 and base portion 453. A drainage opening notch 455 and a bottom surface 457 are also seen. Referring to FIG. 50, a view taken along line 50—50 of FIG. 48 illustrates the mid section and especially a drainage structure 459. Also seen is a blind bore opening 461. Referring to FIG. 51, a sectional view taken along section 51—51 of FIG. 48 more clearly illustrates the extent of the blind bore 461.

Referring to FIG. 52, a side sectional view of a seat member 471 which is made of a substance and configured to give a "living hinge" effect, is shown. The thickness of the main forward and aft portions of the seat member 471 are relatively thick compared to a curved groove 473 which extends across the seat member 471 and bisecting the seat member into a forward portion 475 and a rearward portion 477. Forward portion 475 ends at a forward end 479 and rearward portion 477 ends at a rearward end 481. A somewhat acutely angled notch 483 is formed at a side wall 485 to facilitate angular displacement at the groove 473 having a thinned area 475. In order to achieve the "living hinge" effect, the materials must be chosen which can hingably though slightly flex numerous times without failure. In addition, any members which come together, such as to close and open the notch 483 should either be covered or encased in an isolation member. One such isolation member is a "U" shaped member 487 which clips around the notch 483 and secures it from one side so that the closure of the notch 483 is isolated. One side of the "U" shaped member 487 is ideally glued or riveted to the side wall 485 on one side of the notch 483.

In a further embodiment, shown in FIG. 53, a side sectional view of a seat member 491 which is made of a more rigid material is shown. The thickness of the main forward and aft portions of the seat member 491 are relatively thick, but taper to a center separation space 493 so that when flexion occurs in the vicinity of space 493 there will be no pinching effect, no matter how slight. Below the center separation space 493 is a hinge 495 arranged such that its pivot pin 497 is below both a separated forward portion 501 and a separated rearward portion 503. Forward portion 501 ends at a forward end 505 and rearward portion 503 ends at a rearward end 507. The somewhat acutely angled notch 483 of FIG. 52 has been replaced by a sloping edge terminations of a forward side wall 509 and rearward side wall 511, and including sloping edge termination 513 and 515, respectively. The hinge 495, depending upon its size and thickness, can lend enough support to the side walls 509 and 511 that the absence of side wall immediately underneath and partially to either side of the center separation space 493 is compensated for in terms of strength.

Hinge 495 has a forward leaf 517 and a rearward leaf 519. Although the hinge 495 is illustrated without reference to underlying support and force structures, it is desired that each of the separated forward portion 501 and a separated rearward portion 503 be supported evenly and from positions which would generally be expected to give even support for forces applied at the centers of the separated forward portion 501 and a separated rearward portion 503. In the embodiment of FIG. 22, the coil springs 219, for example, were placed generally about the four corners of the seat member 321. Where the general coverage of a seat member is divided among a separated forward portion 501 and a separated rearward portion 503, it is desirable to provide a balanced support so that no undue downward forces can be applied to the hinge 495. This may involve a configuration wherein the force components are balanced at the center of each portion 501, 503 of the half seating member in either a cross, "+" configuration or a rectangular configuration.

Figure 54:
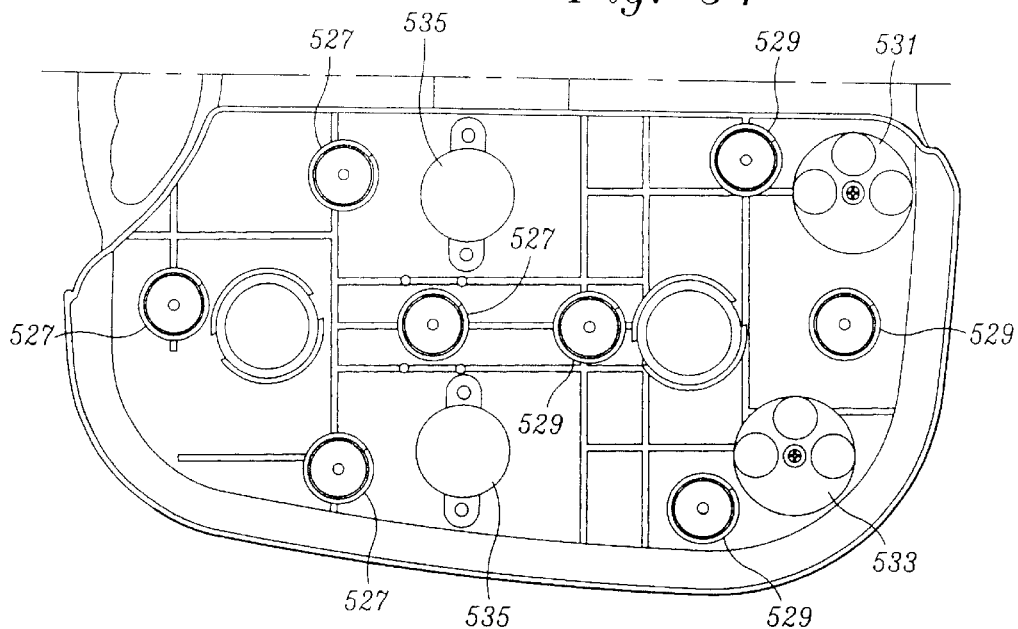
FIG. 54 is one possible alternative embodiment of a base different from that seen in FIG. 22 in which the springs are arranged in a "cross" configuration and including a pair of multiple height member displacement limiting wheels.

The cross configuration is seen in FIG. 54 and illustrating a half section of a base 525 having a first series of preferably integrally formed spring support plugs 527 arranged in a cross or "+" pattern about the rear half of the base 525, and a second series of preferably integrally formed spring support plugs 529 arranged in a cross or "+" pattern about the front half of the base 525. Note that a pair of multiple height member displacement limiting wheels, including inboard wheel 531 and outboard wheel 533 have been provided and displaced more into the corners of the half of the base 525. In addition to the duplication and displacement to the corners of the multiple height member displacement limiting wheels 531 and 535, a user can further customize the feel of the front of the seat 201 to more of a cradling feel or more of a saddle feel. Also seen is a pair of elastomeric members 535 which have been moved into alignment in order to give added support to the hinge 495 to prevent a more extreme angular displacement of the forward portion 501 with respect to its separated rearward portion 503.

Figure 55:
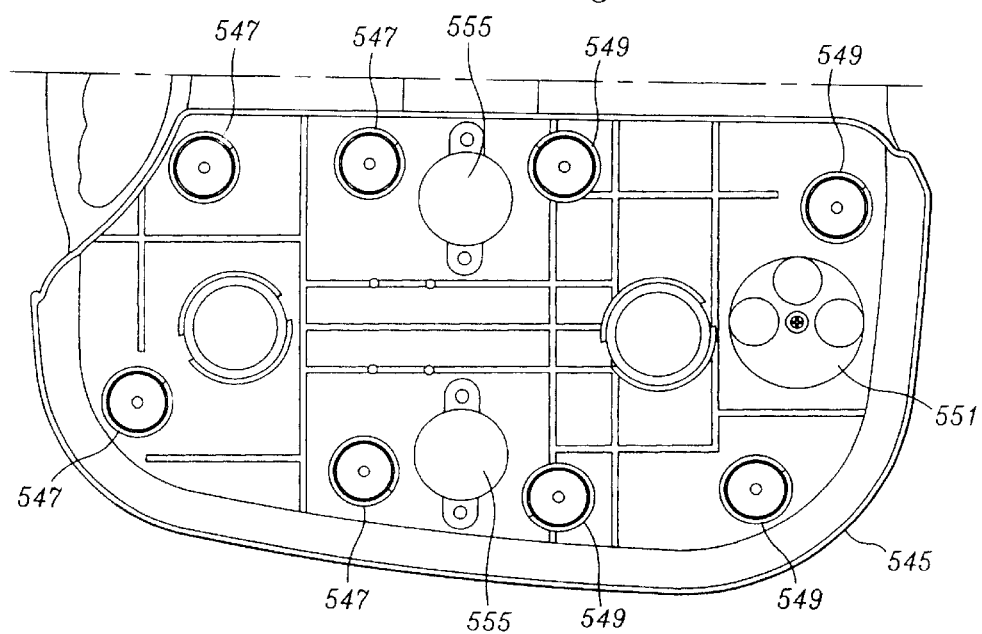
FIG. 55 is another possible alternative embodiment of a base different from that seen in FIG. 22 in which the springs are arranged in a quadrilateral configuration and including a single of multiple height member displacement limiting wheel.

Referring to FIG. 55 a half section of a base 545 having a first series of preferably integrally formed spring support plugs 547 arranged in a quadrilateral or rectangular corner pattern about the rear half of the base 545, and a second series of preferably integrally formed spring support plugs 549 arranged in quadrilateral or rectangular corner pattern about the front half of the base 545 is seen. A single multiple height member displacement limiting wheel 551 is in the same place as before, and the further customization as in FIG. 54 is not had. Again seen are a pair of elastomeric members 555 which have been moved into alignment in order to give added support to the hinge 495 to again prevent a more extreme angular displacement of the forward portion 501 with respect to its separated rearward portion 503, however, where coil springs such as coil springs 219 are mounted so close to the hinge 495, it is possible to either reduce the elastomeric members 555 to one or to move them to other locations, or even in some cases to eliminate them entirely.

Figure 56:
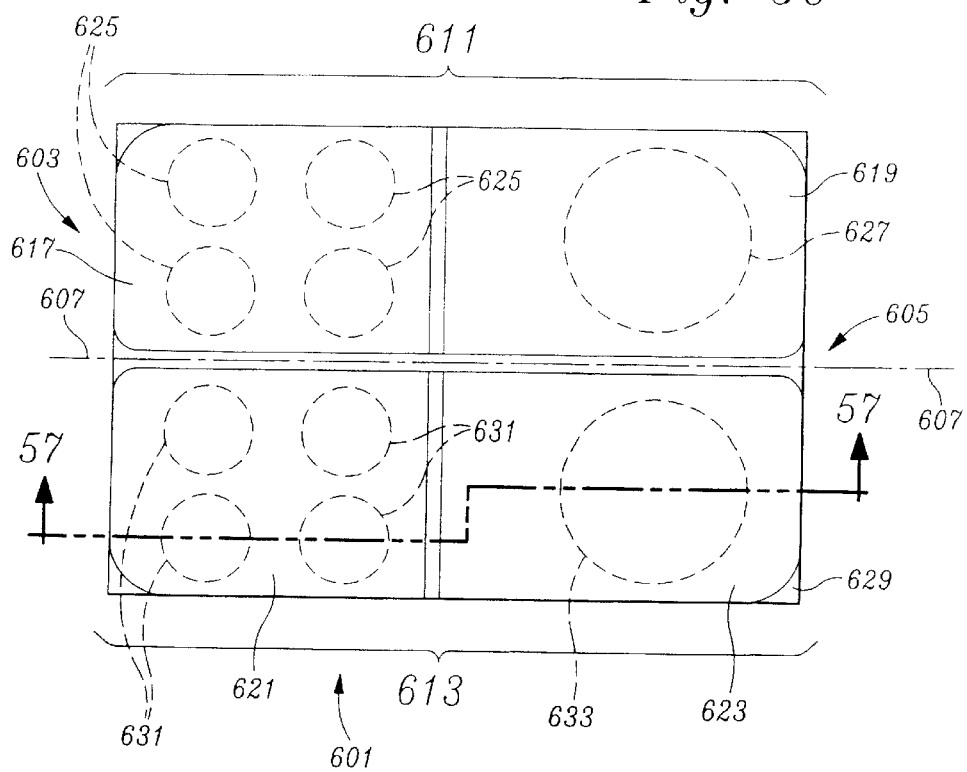
FIG. 56 is a top view of a less complicated and more light weight embodiment of the seat of the invention.

Referring to FIG. 56, less complicated and more light weight embodiment is seen. Whereas the embodiments of FIGS. 22–55 entail a highly mechanical solution, the embodiment of FIG. 56 represents a more simple construction. One of the main ideas of the invention of FIGS. 1–55, in a simplified form, is to provide seating in which the rear portion of the seat has greater movement and height variability to conform with the intended movement and height variability of the ischial tuberosities ("seat bones") of the user. In doing so, and especially by hinging the forward parts of a seat to have a degree of lesser dependence on the rear portions of a seat, this de-coupling separates the movement and support of the ischial tuberosities from the movements and support of the thighs, and also relates to FIGS. 52 & 53. This is seen in the embodiment of FIGS. 22–55 where the height adjustment limit is set at the front portion of the seat 201, and where although the front of the seat 201 is constrained to move forward and down, the rear portion of the seat is constrained only not to move laterally so that the seat member main halves, whether each are hinged between a forward and rear portion or not, have greater independent up and down force displacement movement in order to shift from one ischial tuberosity ("seat bone") to the other. In overview, the rear portion of the advantageous inventive seat is more giving and flexible in providing support than the front portion. The embodiment of FIGS. 22–55, although representing a portable solution useful in nearly every instance where unforgiving existing seating is available, it has an ample width and a short carry handle capable of fitting over and into most chairs. However, in instances where size availability does not adequately clear the seat of FIGS. 22–55, where the available seating will not sustain the embodiment of FIGS. 22–55 either because it is too narrow or too curved, a soft embodiment has been constructed and which embodies the same principles, but is more forgiving of space restriction, either in width or depth, or in curvature of the existing seating. This softer version is shown initially in FIG. 56. FIG. 56 is a top view showing the overall layout of a relatively more soft and pliable seat 601. Seat 601 has a front end 603 and a rear end 605. Seat 601 is separated down its middle axis 607 into a first half member 611 and a second half member 613. The first half member 611 has a forward portion 617 and a rear portion 619. The second half member 613 has a forward portion 621 and a rear portion 623.

Shown in dashed line format, in both sizes and numbers which are exemplary only, is a location of a series of bladders. First half member 611 forward portion 617 has a series of four small bladders 625. The first half member 611 rear portion 619 has a single relatively larger bladder 627. Assuming the same pressure in the undeformed shape, a larger bladder 627 will give more than a series of smaller bladders 625. The bladders are preferably encased in foam rubber and will preferably be air bladders. The forward portions 617 & 621 may be attached to the rear portions 619 & 623 by an external covering, or the forward portions 617 & 621 may be attached to the rear portions 619 & 623 by an independent overlying attachment to a third structure 629. Third structure 629 can be completely soft, as in a cloth layer whose purpose it is to merely order the general relative positioning of the forward portions 617 & 621 and rear portions 619 & 623 as the seat 601 is moved about. Alternative hardnesses of the third structure 629 can serve to accommodate a wide range of other supports. Second half member 613 forward portion 621 has a series of four small bladders 631. The second half member 613 rear portion 623 has a single relatively larger bladder 633, so that the second half member 613 matches the first half member 611. The connection between the first half member 611 and the second half member 613 can also be via a third structure 629, base cloth interconnection where the top coverings extend downward and back up to the other half member, or by an elastic connection.

Figure 57:
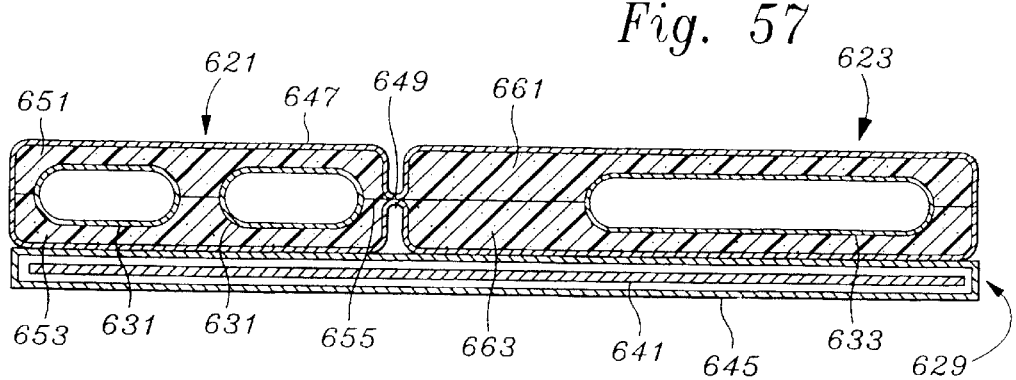
FIG. 57 is a view taken along line 57—57 of FIG. 56 and illustrating details of the internal construction.

Referring to FIG. 57, a sectional view along line 57—57 of FIG. 56 illustrates further details of one possible construction of the seat 601. A rigid member 641 is encased within a cloth envelope 645. A cloth envelope 647 surrounds both second half member 613 forward portion 621 and rearward portion 623. Between the forward portion 621 and rearward portion 623 is a stitch 649 which provides some separation and isolation. The stitch 649 can be a gathered stitch to increase the elasticity of the connecting stitch to further isolate the forward portion 621 from the rearward portion 623. Inside the cloth envelope 647 within the forward portion 621, a first volume of foam rubber includes an upper hemi-volume of foam rubber 651 and a lower hemi-volume of foam rubber 653. A dividing line 655 results when the hemi-volumes 651 and 653 are provided as halves with accommodation spaces for exact placement and fit of the air bladders 631.

Inside the cloth envelope 647 within the rearward portion 623, a second volume of foam rubber includes an upper hemi-volume of foam rubber 661 and a lower hemi-volume of foam rubber 663. A dividing line 665 results when the hemi-volumes 661 and 663 are provided as halves with accommodation spaces for exact placement and fit of the air bladder 631. The placement of the bladders 631 and 633 within the foam rubber volumes 651, 653, 661, and 663 can be achieved by any method, and the volume of foam rubber need not be arranged in hemi-volumes.

Figure 58:
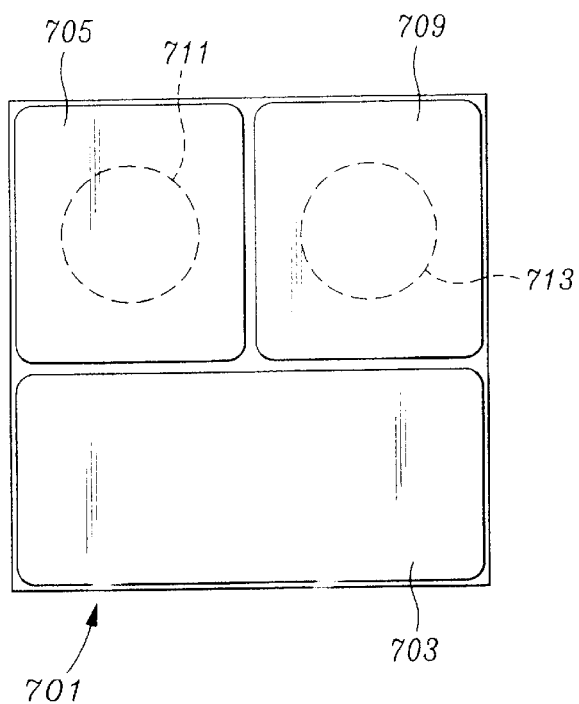
FIG. 58 is a top view of an alternative embodiment of a seating and having a front half section and independently displaceable rear quarter sections.

An alternative embodiment is shown in FIG. 58. Instead of having a main division along the front to back centerline of a seat, the seat of FIG. 58 illustrates a three piece division, including a seat 701 having a front half section 703, a right rear quarter section 705 separated from the front half section 703, and a left rear quarter section 709 separated from both the front half section 703 and the right rear quarter section 705. A rear bladder 711, shown in phantom, is located within right rear quarter section 709, and a rear bladder 713, also shown in phantom, is located within left rear quarter section 709, taken with respect to a person seated on the seat 701.

Figure 59:
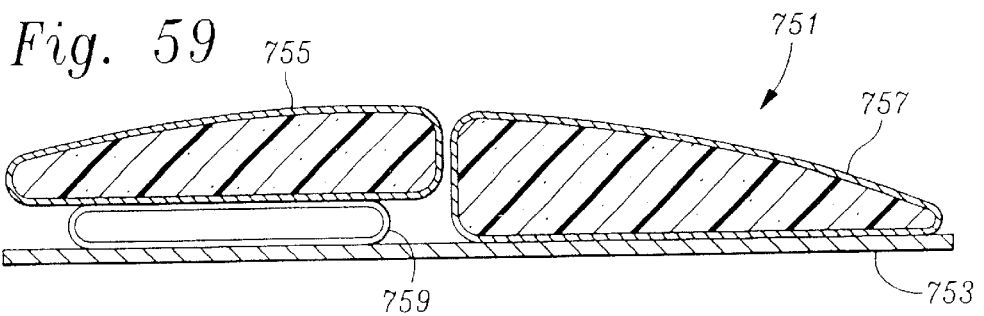
FIG. 59 is a side sectional view a further embodiment using a rear spring to achieve independent rear support.

A further alternative multiple seat platform design is seen in FIG. 59 as a seat 751 having a relatively rigid common base 753, a right rear upper cloth covered quarter foam member 755 and a front continuous half foam member 757 which has an upper surface which tapers into the base 753.

Underneath the right rear upper cloth covered quarter foam member 755, is a curved spring 759. The curved spring 759 has a force loading characteristic which is set to enable a range of displacement over a relatively narrow range of force differential, such as that which would exist as a user shifts from side to side during the process of remaining seated. The existence of the spring is preferably covered in a cloth covering the same as or supplemental to a cloth covering for the right rear upper cloth covered quarter foam member 755.

Figure 60:
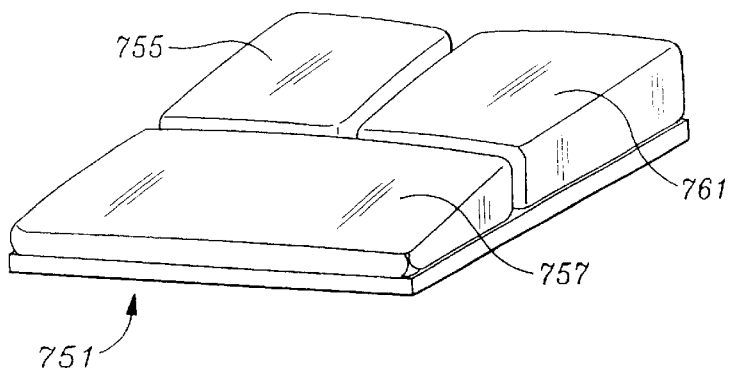
FIG. 60 is a perspective view of the seat seen in FIG. 59 having a side cloth covering on the rear seating portion.

Referring to FIG. 60, a perspective view of the seat 751 further illustrates the visual impression of the seat and further illustrates a left rear upper cloth covered quarter foam member 761. The seat 751 has an appearance and close construction which facilitates use on existing furniture. Where the height of seat 751 is sufficient, seat 751 can be used in place of or as a replacement for conventional seat cushioning.

Figure 61:
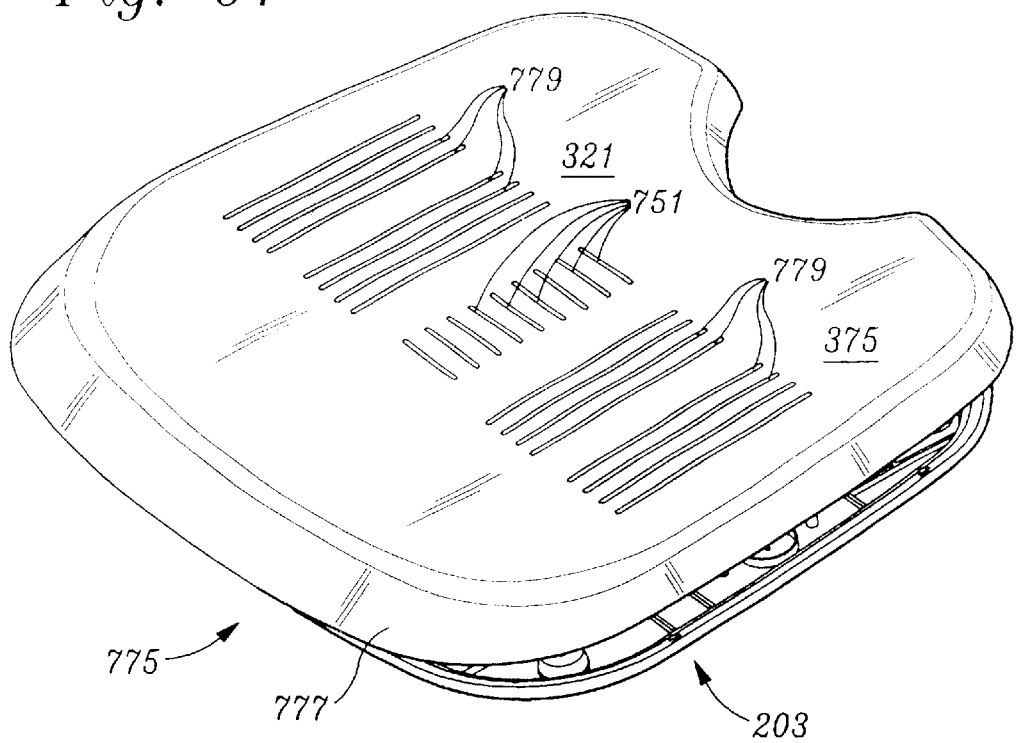
FIG. 61 is an alternative embodiment, in a similar view as that seen in FIG. 25, as having a single, preferably flexible, seat member.

Referring to FIG. 61, a further embodiment of a seat 775 includes the base 203 seen in FIG. 25, but having a unitary seating member 777 mounted atop the same mechanism seen in FIG. 22. Depending upon the flexibility of the material used for the unitary seating member 777, a similar degree of seating action as was had in seating member 201 of FIG. 25 can be had in seat 775 in FIG. 61. Slots 779 are optionally provided, however to further control the deflection of the seating member 777 to give independent action for the left and right halves of seating member 777 as is desired. Also seen are lateral slot 781 which can be used to help decouple the front of the seat 775 from the rear of the seat 775. The slots 781 and 779 can be used in the alternative or combined to produce as much freedom or interdependence between either front or back or between right or left sides, as is desired.

Figure 62:
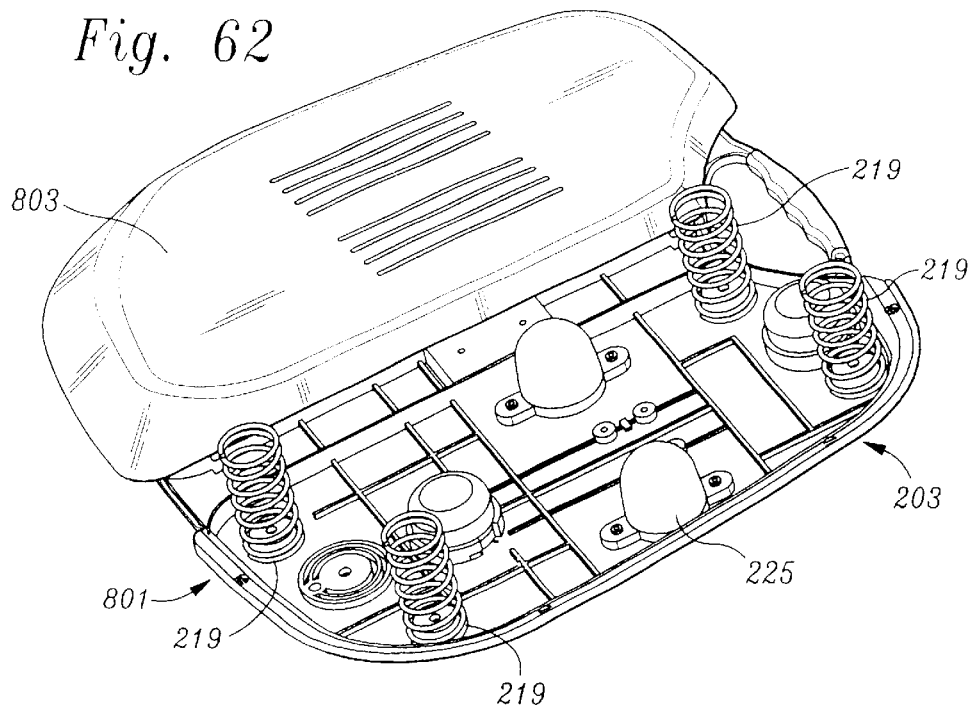
FIG. 62 is an alternative embodiment lacking a mechanism to guide downward motion in a forward direction and in which a "squiggle" movement is enabled in any lateral direction for any seat portion.

FIG. 62 is an alternative embodiment lacking a mechanism to specifically guide downward motion as was seen in FIGS. 8–51, and as embodied in a seat 801. As has been stated earlier, selection of components supported by base 203, such as the springs 219, and elastomeric members 225 can determine both a range of individual weights to be accommodated by the seat 201, as well as the range of motion under compression and whether or not guided. The springs 219, and elastomeric members 225 can be varied in terms of their length or height, strength, hardness and effective operating range to either expand the directions and degrees of motion or to restrict such directions and degrees of motion.

In FIG. 62, a seat member 803 is seen and the seat member 805 (seen in FIG. 63), is removed to illustrate the removal from base 203 of the flat "A" shaped lateral support 263, "Y" shaped lateral support 265 and associated support and operation structure. The seat members 803 and 805 are thus not particularly constrained to follow any particular motion in conjunction with the downward application of force against the seat members 803 and 805. The only restriction on the motion of the seat members 803 and 805 will depend upon the number and type of the springs 219, elastomeric members 225, or other members which support the seat members 803 and 805 with respect to the base 203.

It is preferable, where structure such as springs 219 and elastomeric members 225 are used that they be selected to control the desired force compression in the direction of the base 203, as well as lateral motion. These structures are emphasized, although other structure is permissible, as well as adjustable structure such as multiple height member displacement limiting wheel 237, for example. Thus any other structures chosen should have due consideration for the range of motion they permit.

Figure 63:
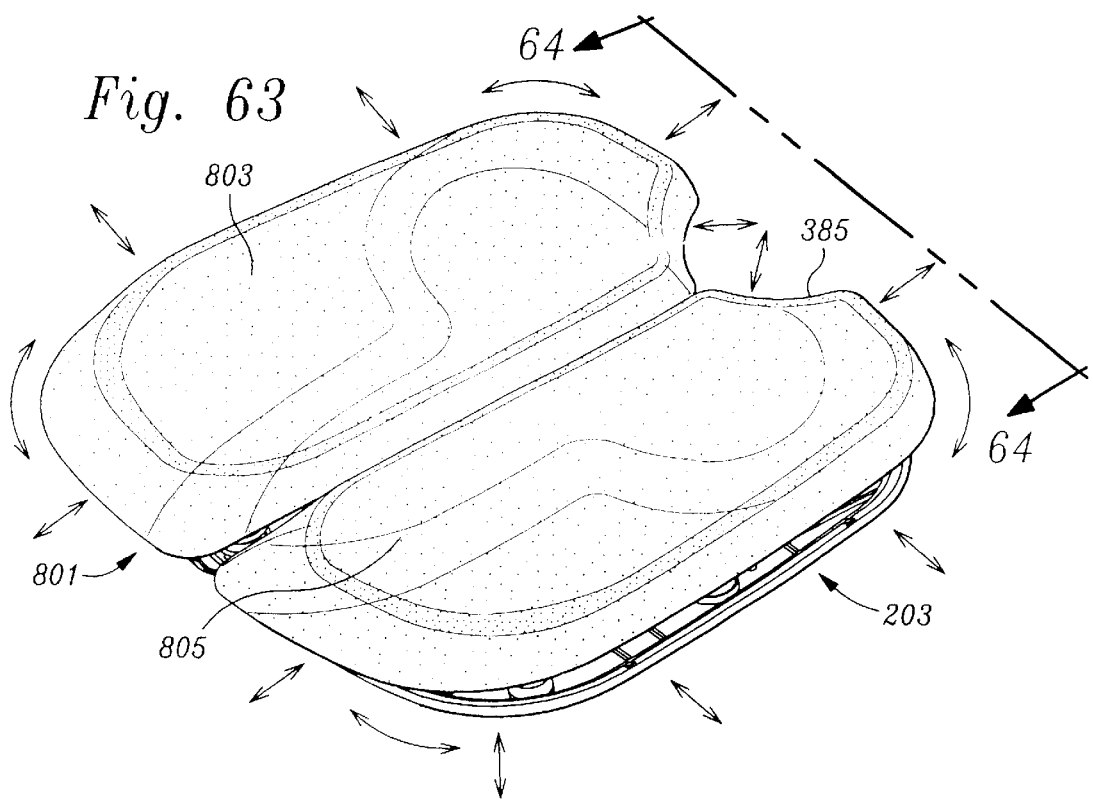
FIG. 63 is a perspective of the alternative embodiment seen in FIG. 62 and illustrating that each seat member can independently move laterally in any direction as well as in a slightly twisting or turning motion.

Referring to FIG. 63, a perspective of the alternative embodiment seen in FIG. 62 and illustrating the seat members 803 and 805 in place have arrows to illustrate the degree of potential movement. Curved arrows at the corners emphasize that seat members 803 and 805 can turn a few degrees both ways from their rest positions in a motion in which the top of the seat members 803 and 805 remain generally within their plane but enable angular pivoting about nearly any point over the top surface of the seat members 803 and 805. To the extent that the seat members 803 and 805 do not interfere with each other, each of the seat members 803 and 805 can turnably displace with respect to the other.

Arrows are located and pointed toward and away from each of the seat members 803 and 805 to illustrate that the seat members 803 and 805 are displaceable laterally in any direction, generally in the plane adjacent the upper surface of the seat members 803 and 805. All of the arrows indicating both lateral motion and turning motion are seen with respect to a view of the seat 801 of FIG. 63 in which the seat members 803 and 805 are not in a state displaced toward the base 203. As an individual sits upon the seat 801, all of the motions indicated by the arrows occur in combination with both up and down motion and tilt motions. Further, since each of the seat members 803 and 805 can move independently, they are able to further free the ischial tuberosities of the user to achieve more restful positions. Further, where a user moves his weight to one side and then rest independently on the other side, the two seat members 803 and 805 will "give" to accommodate pressure tending to either further separate or further move the seat members 803 and 805 with respect to each other. Ideally, the amount of lateral movement should be about one quarter of an inch in either direction. With this limitation, for example, the two seat members 803 and 805 can mutually accommodate a lateral displacement toward and away from each other of a total of about one half inch. Further, the number of permutations of relative movement are endless.

Figure 64:
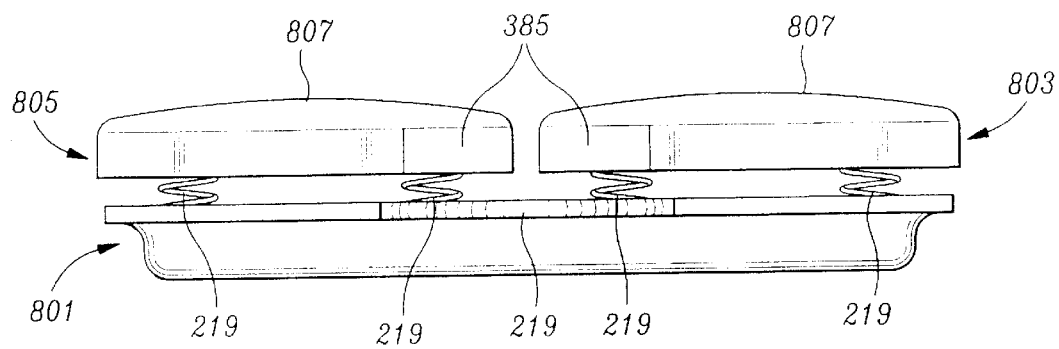
FIG. 64 is a rear view of the alternative embodiment seen in FIGS. 62 & 63 and emphasizing the curved nature of the padding or covering over the seating members.

FIG. 64 is a rear view of the alternative embodiment of seat 801 seen in FIGS. 62 & 63 and emphasizing the curved nature of the covering or padding members 807 covering the seat members 803 and 805. So, from a rear view, the padding members 807 are seen to be convex upwardly to provide better support to a user's ischial tuberosities. Also seen are the two indentive shapes 385 which both permit access to the handle 219 as well as to provide additional clearance and freedom for the posterior of the user. The additional clearance provided by the lack of support from absence of material removed in making the indentive shapes 385 provides greater freedom for the user.

Figure 65:
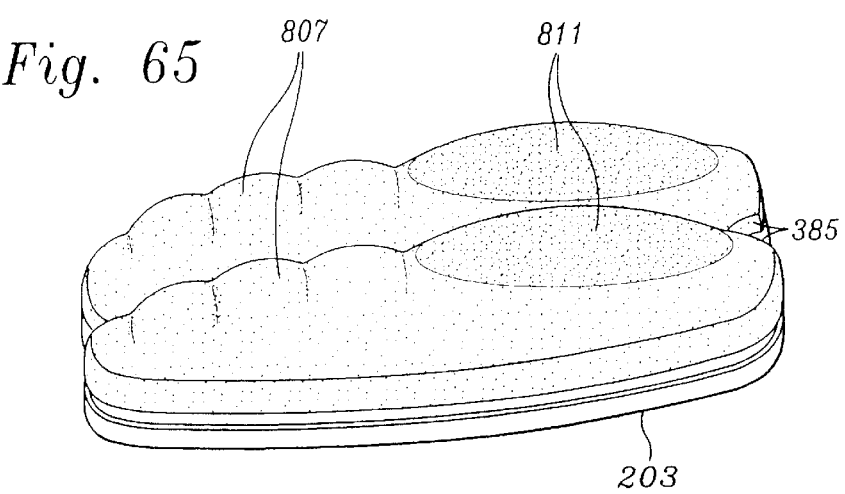
FIG. 65 is a perspective view of the seat of FIG. 64 with additional curved padding at the rear of the seating members for providing more direct support to the ischial tuberosities

Referring to FIG. 65, a relatively low height perspective view of the seat of FIG. 64 includes additional curved padding 811 shown in the shape of a spherical section and curved to a greater degree than the convex padding members 807 and situated above and in addition to the upwardly convex padding members 807. In this configuration, the padding 811 provides an additional degree of upward support over the upwardly convex padding members 807 to provide more direct and focussed ischial support. The firmness of both the curved padding 811, and upwardly convex padding members 807 can be pre-selectably controlled to give the seating comfort and support desired. Further, the firmness of both the curved padding 811, and upwardly convex padding members 807 can be selected with respect to each other to give several different looks and performance levels.

As has been discussed, the independent platform movement of the seating assembly of the invention lends itself to a variety of environments, with appropriate additions and changes to respond to the technical needs of the environment. One such environment is the motor vehicle environment. In general, although varying widely from one automotive application to another, the typical passenger automobile seat angles front to back somewhat severely with a neutral angle of about 7 degrees taken with respect to the horizontal plane of a vehicle on flat ground. As a result, a user's body weight distribution is likely to be more focused at the rear of the seat which would normally tend to minimize the available range of motion at the rear of the seat, and at the rear of independent seat halves.

Further, in a passenger automotive application, the user's legs typically need to be supported over a longer length than in seating where the neutral angle is zero, and where a user will typically supplement leg support by foot-on-floor support. As longer length of leg contact is employed, simply lengthening two independent right and left leg platforms, would likely restrict the independence needed for user adjustment of pressure of the ischial tuberosities. The leverage one leg could employ at the front of the seating would restrict the already geometrically restricted movement of the rear platform (due to the seven degree neutral angle). In other words, in a motor vehicle environment, the weight of the legs is far more substantial than in an upright seat due to the angle of the seat and the floorboard height, and especially the focused weight on the very front of the seat. As a result, the depth of the seat pan or support, from front to back,) is longer, but additional front and rear zones are utilized to maintain independence of the rear supports and to allow.

Further, in a motor vehicle, seating safety is a major issue, and a safety solution is required to prevent "submarining", a case where an occupant slides forward, even under a secured seat belt, upon impact in an accident. The independent fore and aft platform movement of the seating assembly, as well as the construction of the support platform prevents this effect. Further, the overall motion of the vehicle, the g-forces it exerts on the user and passengers, require a design solution which results in a reduction in the overall range of motion of the seat in the horizontal direction to avoid a feeling of or the fact of looseness or insecurity.

Further, in passenger automotive seating construction standards, the "H-point" requirement imposes height constraints combined with space already taken up with seat option electronics under a powered seat which severely limits the space in which independent seating can be made to operate properly.

Figure 66:
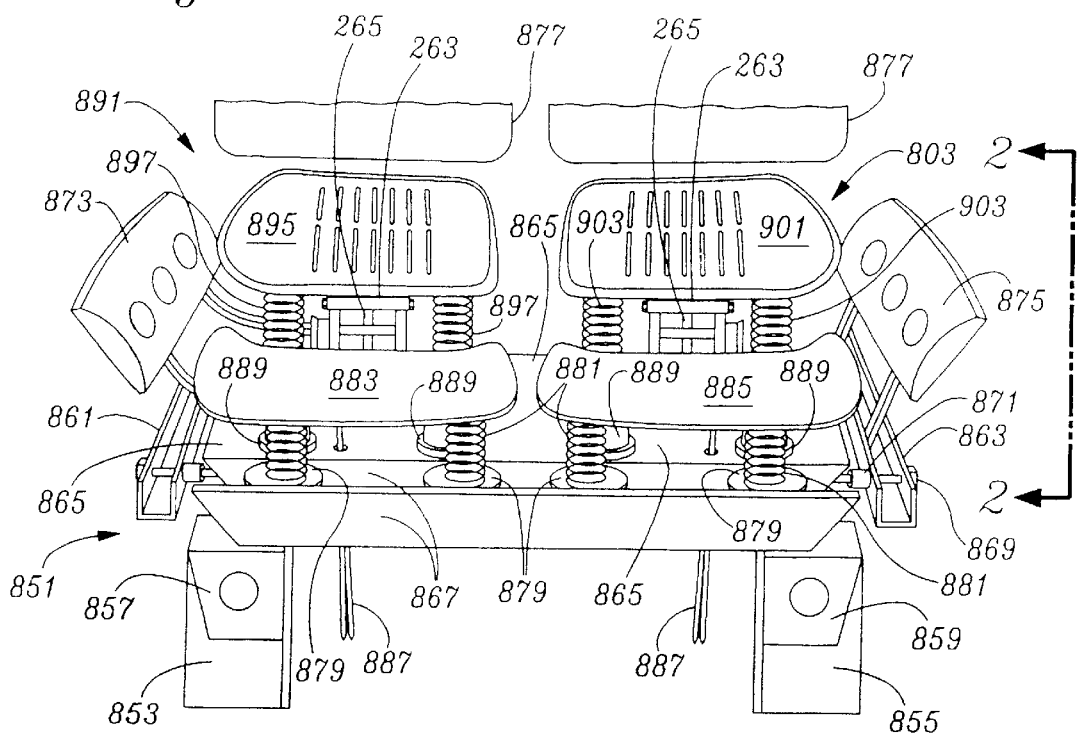
FIG. 66 is a rearward looking perspective view of the assembled components of a further embodiment of the seat assembly, with four (4) seat platforms, or support members, configured for use in a motor vehicle or aircraft environment and with a specialized base.

The result is best initially seen by referring to FIG. 66 which is a rearward looking perspective view of the assembled components of a further embodiment of the seat assembly, seen as a motion seat assembly 851. Motion seat assembly 851 is designed for a passenger automotive environment and is shown attached to supports 853 and 855, and there may be additional supports in the rear of the seat-not shown in FIG. 66) which will typically be structures extending upwardly from a body inside a motor vehicle. A pair of structural beams 857 and 859 which support a pair of upwardly directed side beams 861 and 863. There are two additional attachment beams in the rear, (not seen in FIG. 66) to make a total of four for four point support. Other schemes for base support are contemplated, including beam supports, or in some cases a flat plate support where a motor vehicle body presents such a surface for mounting.

The side beams 861 and 863 form the structural focal areas for support of a central support 865, which is seen as being somewhat pan shaped and having a front "U" shaped channel portion 867 extending across the front of the motion seat assembly 851, which serves to both support, locate, and provide a greater distance for travel for support springs used for motion seat assembly 851. The main extent of each central support 865 is through bolts at the four corners of 865, that are attached to a lower linkage system structure which is part of the steel seat frame. Additional structural strength is gained by bolts 869 which extend generally horizontally, with respect to FIG. 66 and which may extend through grommets 871 for both spacing, wear and silencing.

At the center of each of the pair of upwardly directed side beams 861 and 863, an angled side support 873 and 875, respectively, are seen. The angled side supports 873 and 875 serve several functions. First, they provide some side stability and safety, both assisting in holding the user in the seat around turns. Second, they create a perception of support consistent with existing automotive seating, through some cradling. Third, an angled limit for the seat and are arranged in such a way to encourage the user to be positioned properly for the working components of the motion seat assembly to be properly engaged with the user. Fourth, the angled side supports 873 and 875 will be used to support upholstered padding which cooperates with padding on the main portion of the seat to comfortably urge the user into the proper position. Fifth, the angled side supports 873 and 875 provide spacing from adjacent upholstered members, if present, and operate to define the proper seated orientation. Each of the angled side supports 873 and 875 shown have openings as are necessary to secure further padding and upholstery as needed.

The front "U" shaped channel base support is seen as supporting a series of four cylindrical cups 879, each of which supports a spring 881. The springs 881 may be recessed as is necessary to realize desired spring length and extension necessary for down-up movement. The top of the springs 881 engage the underside of two forward support platforms including a first forward platform member 883 and a second forward platform member 885. Each of the first and second forward platform members 883 and 885 are shown as being held down with a central flexible tie 887. The flexible tie 887 is useful in assembly, but may not be needed where the members 883 and 885 are held down by other structures, such as upholstery and other hold down structures. Just behind each of the springs 881 is a deformable fulcrum member 889. Each member 883 and 885 derives four point support from each set of two springs 881 and set of two fulcrums 889, the pair of springs supporting from the front and the fulcrums supporting from the rear of the respective member 883 and 885.

Located aftwardly of the platform members 883 and 885 are a further pair of motion member assemblies 891 and 893. Motion member assembly 891 includes an upper member 895, four support springs 897 located at the four corners of the upper member 895, and a flat "A" shaped lateral support 263 and "Y" shaped lateral support 265 seen earlier which are used to control the limit of the direction and amount of translational and pivoting movement of the upper member 895. The exact parameters and limits of control are expected to vary with the type of seating utilized. The example of FIG. 66 is expected to be more of a bucket-type automotive seat while bench seating may involve a more widely expansive arrangement with wider platform members.

Similarly, motion member assembly 893 includes an upper member 901, four support springs 903 located at the four corners of the upper member 893, and also the a flat "A" shaped lateral support 263 and "Y" shaped lateral support 265 seen earlier which are used to control the limit of the direction and amount of translational and pivoting movement of the upper member 901. Both of the motion member assemblies 893 and 891 are expected to have one or more fulcrums 889 as may be necessary to further control the force and motion profile of the motion member assemblies 893 and 891 as their upper members 895 and 901 are compressed downwardly. The central support 865 provides a stable base from which the first and second forward members 883 and 885, central flexible tie 887, fulcrum members 889 and all components of the pair of motion member assemblies 891 and 893 are supported, and may contain other features to affect such support.

Figure 67:
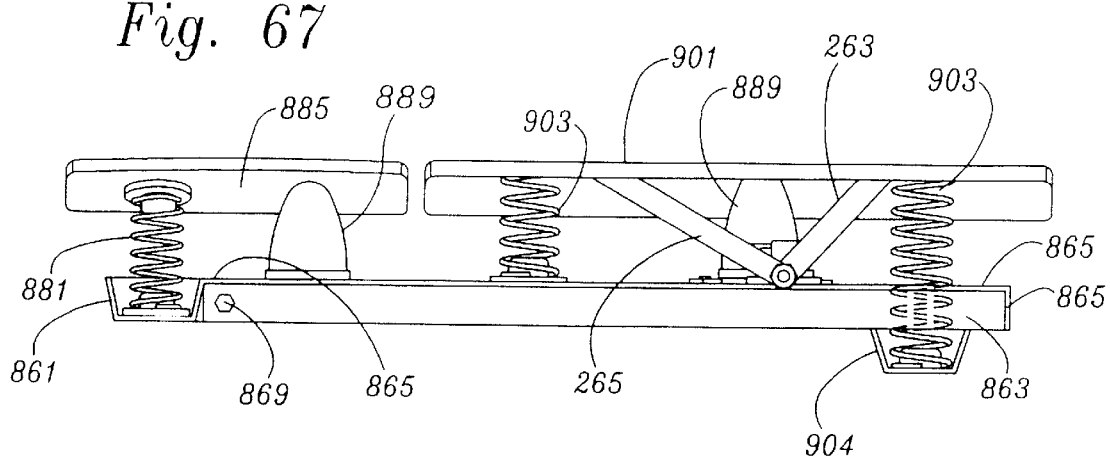
FIG. 67 is a side view of the same assembled components seat of FIG. 66 with a side retaining structure removed for clarity.

Referring to FIG. 67, a side view of the motion seat assembly 851 is seen without the presence of the angled side support 875, removed for clarity. The relationship between the forward platform member 885 and the upper platform member 901 can be seen. In FIGS. 66 and 67, a motion seat assembly 851 is illustrated as a central support 865 supporting a 4-part seat platform, including the forward members 883 and 885, and the upper members 901 and 895 where the members 883, 885, 895 and 901 parts move independently of one another in response to the user's movement. Different configurations may differ, but FIGS. 66 and 67 illustrates a configuration that consists of 2 larger, rear platforms as members 895 and 901 and 2 smaller, front platforms as members 883 and 885.

Figure 68:
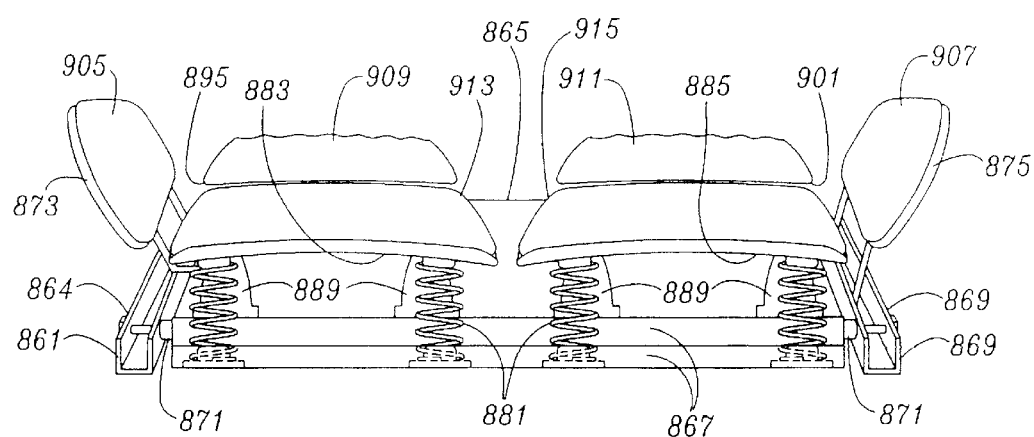
FIG. 68 is a front view illustrating an initial layer of padding the relative thickness of supported pads on both the independent support members and the side retaining structure.

FIG. 68 is a front view illustrating an initial layer of padding relative thickness of supported pads on the four independent support platform members 883, 885, 895 and 901, and the side retaining structures 873 & 875, and include side support pads 905 and 907 for angled side support 873 and 875 respectively. A set of rearwardly located pads 909 and 911 are seen supported by members 895 and 901 and a set of forwardly located pads 913 and 915 are see supported by front platform members 883 and 885.

Over the pads 905, 907, 909, 911, 913 and 915 a finishing trim of additional layers of padding, or of material of varying densities and possibly varying thicknesses (not shown) depending upon the motor vehicle seat, whether a bucket or bench style, for example. Next, fabric or leather cover trim becomes part of the seat assembly 851 invention, as it is sewn together with elastic, fabric pockets, or baffles to permit ease of movement of the seat platforms so that each independent seat platform is not too inhibited by the finish cover. As a result, seat covering finish can be used, along with mechanisms within the mechanical seat, to control motion. However, it is preferable for extended wear, for the outside finish to be consistent with any natural limitations in the motion of the motion seat assembly 851.

Figure 69:
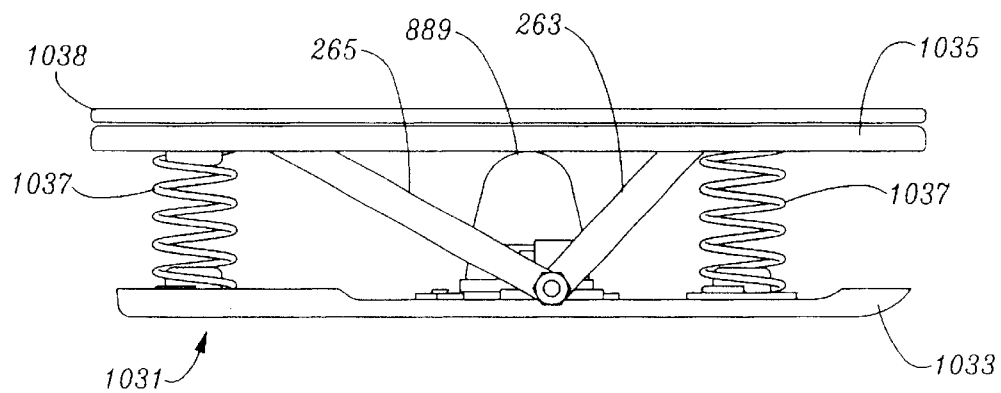
FIG. 69 is a side perspective view of the assembled components of the left side facing of an independent seating member of a seating member pair with base. The right side is not visible, but is generally a mirror image. In addition, it is possible to install this system as two independent seating members. This is a further embodiment of the seat assembly configured for use in a motor vehicle or aircraft environment.

Referring to FIG. 69, a side perspective view of the assembled components of a single independent seating member of a seating member pair as a further embodiment of the seat assembly configured for use in an aircraft environment, is shown. A motion seat assembly independent unit 1031, which is in the context of the seating in which it is placed a half unit shown with some separation from another independent as was seen in FIG. 70, includes a base 1033 and an upper support member 1035. The term "independent unit" is not meant to be limiting, as a single unit could occupy a complete seating area, and on the other hand four such units could occupy the same seating area, or two such units as will be shown in FIG. 70. Further, FIG. 70 also generally illustrates how the seating member pairs 1031 & 1041 can be combined together within just one larger base structure 1043. Further, each of the independent units 1031 and 1041 can, instead of each having a single base 1033 can have a single larger base (not shown in FIG. 69) from which each upper support member 1035 depends (not shown). The use of the term "independent unit" is only to describe what is seen in the drawings and other more or less numerous subdivisions of the seating area may be had. Springs 1037 are seen at the four corners of the generally rectangular structure, and surrounding flat "A" shaped lateral support 263 and "Y" shaped lateral support 265 seen earlier which are used to control the limit of the direction and amount of translational and pivoting movement of the upper member 1035 with respect to the base 1033. A fulcrum member 889 is also seen near the central area of the middle area of the motion seat assembly independent unit 1031. The rigidity of the fulcrum member 889 can be selected based upon the seating characteristic needs.

Figure 70:
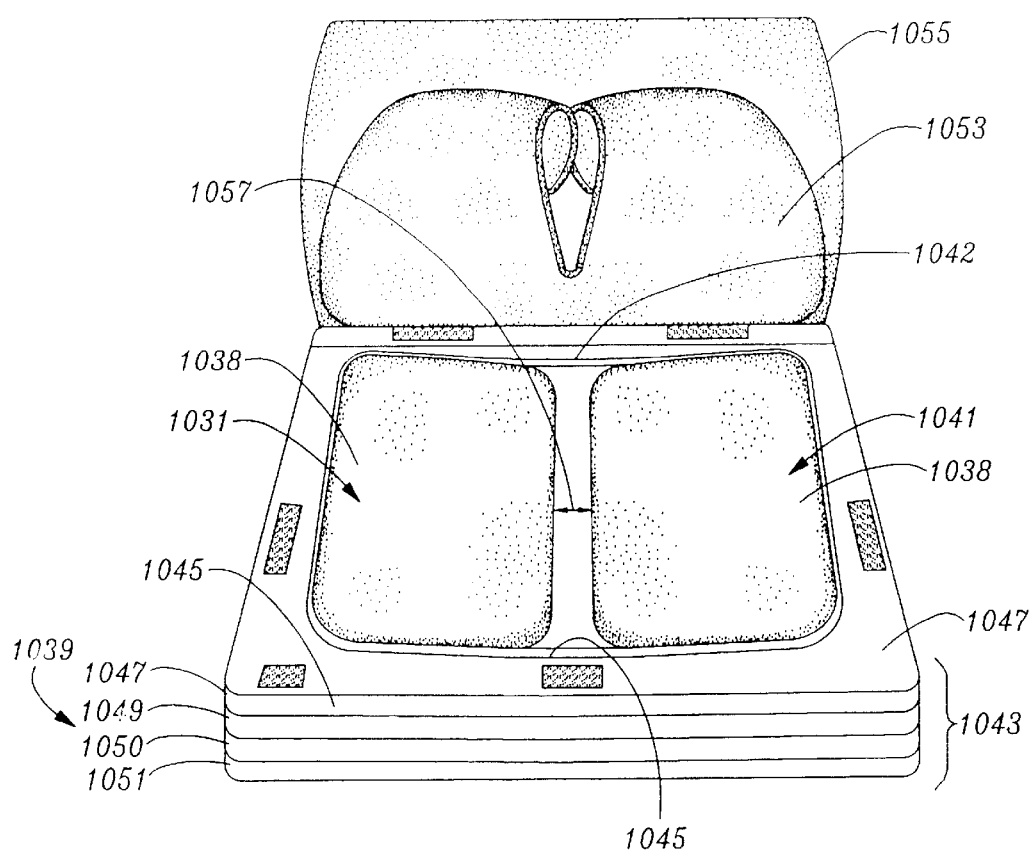
FIG. 70 illustrates the pair of independent seating assemblies fitted within the confines of a foam aircraft seat.

Referring to FIG. 70, a pair of independent seating assembly independent units are illustrated as fitted within the confines of a foam aircraft seat 1039 and include the motion seat assembly independent unit 1031 seen in FIG. 69 and an additional motion seat assembly independent unit 1041, and as an option, now supported by a common base member 1042. The motion seat assembly independent units 1031 and 1041 may be made identical to each other or may be made as mirror images of each other as the specific needs of the seating application arises.

In FIG. 70, a laminated or single piece foam stack 1043 includes a central cutout 1045. The foam stack 1043 may include a number of layers, such as an upper layer 1047 which provides a taught appearance when the seat is unoccupied but which gives to place the motion seat assembly independent units 1031 and 1041 in force and motion control as soon as a user is seated. As to the foam, other layers may be used, including 1049, 1050 and 1051, some of which may be spacers or layers of varying thickness. Additionally, flotation foam may be used.

Overlying the layer 1047 and the motion seat assembly independent units 1031 and 1041 is a divided foam layer 1053. Above the divided foam layer 1053 is a generally flat covering layer 1055. The successive layers which exhibit differing degrees of segregative independence, such as the progression from the motion seat assembly independent units 1031 and 1041 to the divided foam layer 1053 to the generally flat covering layer 1055 illustrate but one way in which the independence of the mechanical seat supports can be integrated into the whole seat while keeping their independence. Further, generally flat covering layer 1055 may be made of stretchable material to further enable independent motion. Other alternatives include providing pleats or baffles in the generally flat covering layer 1055 along a space 1057 between the motion seat assembly independent units 1031 and 1041, or perhaps the provision of a separation tuft at a point just over the space 1057.

The completed motion seat assembly independent unit 1031 or 1041 as a component system inserted into a cut-out foam seat cushion, with single base 1042 offers several advantages over completely assembled seating units. First, it allows the individual components 1031 and 1041 to be used as a modular cushion insert in virtually any aircraft seat, as either a retrofit, or replacement of existing solid foam cushions. This means immediate ability to add to an aircraft seat, as opposed to re-constructing the entire seat from the structure up. Secondly, foam aircraft seat 1039 can be instantly dis-assembled by aircraft personnel to replace any damaged individual motion seat assembly independent units 1031 and 1041, or as the components exist a common base 1042 in lieu of individual bases 1033. Damage includes spills, impact from falling objects or entry from sharp objects. It is a simple matter to lift the generally flat covering layer 1055, typically held in place with Velcro, and then to lift the divided foam layer 1053 seen in FIG. 70, followed by simply picking up the damaged one of the motion seat assembly independent units 1031 and 1041, inserting a new one and simply replacing the layers 1053 and 1055 in place.

All of the movements of all of the embodiments of the invention in FIGS. 1–70 are thus shown to easily accomplish the goals of the invention in the freedom and comfort given the user.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A seat comprising:
    a central support;
    a first and a second adjacently located seating bodies, at least one motion mechanism connected between said central support and each of said first and said second adjacently located seating bodies, said motion mechanism for providing said at least one of a rocking motion, a vertical up and down motion, a limited turning motion, and a lateral motion, each of said first and said second adjacently located seating bodies having a predetermined neutral angle, wherein the neutral angle is the angle with respect to a horizontal axis orthogonal to the earth's gravity vectors that the seating body resides at when no external forces are present on the seating body; and
    a third seating body located adjacent said first and said second adjacently located seating bodies for providing said at least a vertical up and down motion, said third seating body for providing additional load characteristics to a user of said seat.

2. The seat of claim 1, and further comprising a fourth seating body located adjacent said third seating body for providing said at least a vertical up and down motion and for accepting distribution of said additional load characteristics to said user of said seat.

3. The seat of claim 1, wherein the neutral angle is approximately seven degrees.

4. The seat of claim 1, wherein said first and said second adjacently located seating bodies provide an ischial tuberosities target area, said ischial tuberosities target area defined as the ideal location on the seating body for an occupant to sit, the ischial tuberosities target area extending about midway of a length of each of said first and said second adjacently located seating bodies.

5. The seat of claim 1, wherein said first and said second adjacently located seating bodies are each covered by a single cushion.

6. The seat of claim 1, wherein said first and said second adjacently located seating bodies include a plurality of slots to achieve desired flexibility of said at least one seating body.

7. The seat of claim 1, wherein said first seating body moves independently of said second seating body.

8. The seat of claim 1, and further comprising:
    a first angled side support adjacent said first seating body and having an inclined angle toward said first seating body;
    a second angled side support adjacent said second seating body and having an inclined angle toward said second seating body, said first and second angled side supports for directing a user's seat pressure onto said first and said second adjacently located seating bodies.

9. The seat of claim 8, wherein said first and said second angled side supports are each covered by a single cushion.

10. The seat as recited in claim 1 and wherein said motion mechanism further comprises a plurality of springs having first ends supported from said central support and second ends engaging one of said first and said second adjacently located seating bodies.

11. The seat as recited in claim 1 and wherein said motion mechanism further comprises a first constraining support having a first end pivotally connected to said central support and a second end pivotally connected to at least one of said first and said second adjacently located seating bodies.

12. The seat as recited in claim 11 and wherein said motion mechanism further comprises a second constraining support having a first end pivotally connected to said central support and a second end translatably and pivotally connected to said at least one of said first and said second adjacently located seating bodies.

13. The seat as recited in claim 1 and wherein said motion mechanism motion assembly further comprises an elastomeric member attached to at least one of said central support and one of said first and said second adjacently located seating bodies.

14. A motion seat assembly independent unit comprising:
    a base support;
    an upper support member;
    at least one motion mechanism connected between said base support and said upper support member, and holding said base support to said upper support member to form said motion seat assembly independent unit, said motion mechanism for providing said at least one of a rocking motion, a vertical up and down movement, a turning, and a lateral motion and comprising at least two of a spring, a constraining support, and a deformable member.

15. The motion seat assembly independent unit as recited in claim 14 wherein said deformable member is a fulcrum member centrally located within said motion seat assembly independent unit.

16. The motion seat assembly independent unit as recited in claim 14 wherein said motion seat assembly independent unit is a half unit for occupying substantially half of a seating area.

17. The motion seat assembly independent unit as recited in claim 14, and further comprising:
    an aircraft seat support structure having at least one foam member having a central aperture within which said motion seat assembly independent unit rests.

18. The motion seat assembly independent unit as recited in claim 17 and further comprising a plurality of containment foam members forming a stack, and further including a covering member.

* * * * *